(12) United States Patent
Murade

(10) Patent No.: US 6,388,721 B1
(45) Date of Patent: *May 14, 2002

(54) LIGHT SHIELDING STRUCTURE OF A SUBSTRATE FOR A LIQUID CRYSTAL DEVICE, LIQUID CRYSTAL DEVICE AND PROJECTION TYPE DISPLAY DEVICE

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/825,843

(22) Filed: Apr. 5, 2001

Related U.S. Application Data

(63) Continuation of application No. 09/091,106, filed as application No. PCT/JP97/03752 on Oct. 16, 1997, now Pat. No. 6,297,862.

(30) Foreign Application Priority Data

Oct. 16, 1996 (JP) .............................. 8-273810

(51) Int. Cl.[7] ........................ G02F 1/136; G02F 1/1333
(52) U.S. Cl. ........................ 349/44; 349/110; 349/111
(58) Field of Search ............................ 349/43, 44, 95, 349/110, 111; 257/59, 72

(56) References Cited

U.S. PATENT DOCUMENTS

| | | | |
|---|---|---|---|
| 4,759,610 A | 7/1988 | Yanagisawa | 349/162 |
| 5,432,625 A | 7/1995 | Morin et al. | 349/42 |
| 5,517,342 A | 5/1996 | Kim et al. | 349/43 |
| 5,680,186 A | 10/1997 | Watanabe et al. | 349/95 |
| 5,724,107 A | 3/1998 | Nishikawa et al. | 349/38 |
| 5,744,821 A | 4/1998 | Song | 257/59 |
| 5,745,194 A | 4/1998 | Nakashima et al. | 349/38 |
| 5,781,261 A | 7/1998 | Ohta et al. | 349/111 |
| 5,822,027 A | 10/1998 | Shimada et al. | 349/39 |
| 5,936,685 A | 8/1999 | Ito et al. | 349/38 |
| 5,966,193 A | 10/1999 | Zhang et al. | 349/110 |

FOREIGN PATENT DOCUMENTS

| | | |
|---|---|---|
| EP | 0691565 A1 | 1/1996 |
| EP | 0725301 A1 | 8/1996 |
| JP | A-58-159516 | 9/1983 |
| JP | A 64-28622 | 1/1989 |
| JP | A 3-50527 | 3/1991 |
| JP | B2-3-52611 | 8/1991 |
| JP | A 3-209777 | 9/1991 |
| JP | A 6-18921 | 1/1994 |
| JP | 6-67210 | 3/1994 |
| JP | A 6-75244 | 3/1994 |
| JP | A 6-82826 | 3/1994 |
| JP | 6-102531 | 4/1994 |
| JP | A 7-43700 | 2/1995 |
| JP | A 7-122754 | 5/1995 |
| JP | A 7-152047 | 6/1995 |
| JP | A 8-32082 | 2/1996 |
| JP | A-8-160409 | 6/1996 |

*Primary Examiner*—William L. Sikes
*Assistant Examiner*—Tarifur R. Chowdhury
(74) *Attorney, Agent, or Firm*—Oliff & Berridge PLC

(57) ABSTRACT

Placement of a first light shielding film (7) at least below the channel region (1c) of a TFT which drives a pixel, and of a second light shielding film (3) above the same prevents impingement of light coming from above or from below on that channel region (1c). Further, a second light shielding film (3) is formed to cover the channel region (1c) and the first light shielding film (7), thereby to prevent the surface of the first light shielding film (7) from direct exposure to light.

9 Claims, 19 Drawing Sheets

(a)

(b)

(c)

(d)

(e)

LIGHT SHIELDING STRUCTURE OF A SUBSTRATE FOR A LIQUID CRYSTAL DEVICE, LIQUID CRYSTAL DEVICE AND PROJECTION TYPE DISPLAY DEVICE

This is a Continuation of Application No. 09/091,106 filed Jun. 12, 1998 filed as PCT/JP97/03752. The entire disclosure of the prior application is hereby incorporated by reference herein in its entirety.

BACKGROUND OF THE INVENTION

This invention relates to a technique which is suitably adapted for production of a substrate for a liquid crystal device, and a liquid crystal device and projection type display device based on the use thereof. This invention relates more particularly to a light shielding structure of the substrate for the liquid crystal device which is used as a pixel switching element of a thin film transistor (to be abbreviated as TFT hereinafter).

PRIOR ART

Conventionally, a liquid crystal device is put into practice where pixel electrodes have been arranged in the form of a matrix on a glass substrate, and TFTs made of an amorphous silicon film or a polysilicon film have been prepared in correspondence with each pixel electrode, and which is so constructed as to drive a liquid crystal by applying a voltage through the TFT to each pixel electrode.

Among such liquid crystal devices, one incorporating a polysilicon film of which it is possible to assemble peripheral driving circuits such as a shift register or the like on the same substrate through the same process, allows a high density integration of circuit elements and attracts general attention.

With the liquid crystal device incorporating TFTs, the top of a TFT for driving a pixel electrode (to be referred to as a pixel TFT hereinafter) is covered by a light shielding film such as a chromium film called a black matrix (or a black stripe), which is placed on the opposite substrate. This is to prevent the channel region of the TFT from being exposed to direct light which would otherwise cause a leakage current. However, a leakage current caused by exposure of the TFT to stray light may arise as a result of light reflected from a polarizer placed on the back surface of the liquid crystal device, not to mention the adverse effects due to incident light itself.

To minimize such leakage current due to reflective light, an invention is proposed in which the back surface of the TFT is also covered by a light shielding film (Japanese Patent Publication, No. Hei 3-52611). If the light shielding film is placed on the back surface of the TFT such that it exceeds in size the opening of the black matrix placed on the opposite substrate, incident light strikes directly on the light shielding film, and light reflected therefrom illuminates the channel region of the TFT, which may cause it to generate a leakage current. This is because, when a process necessary for the placement of a light shielding film on the back surface of the TFT is put into practice, precise alignment of a black matrix placed on the opposite matrix with a pixel region placed on the substrate for the liquid crystal device is difficult, and thus incident light through the opposite substrate directly impinges and is reflected on the part of light shielding film that exceeds in size the opening of the black matrix As a result, the channel region of TFT is illuminated, causing the leakage current to flow. Particularly when alignment of the light shielding layer placed on the substrate for the liquid crystal device with the black matrix takes place with a large error, light reflected from the surface of light shielding film increases considerably, and, as the channel region is illumined by this reflective light, a leakage current from the TFT is increased, resulting in a degraded display as a result of flaws such as cross-talks or the like.

The object of this invention is to provide a technique which, when applied to a liquid crystal device, can minimize a leakage current generated from a TFT exposed to light. Another object of this invention is to provide a technique which can minimize a leakage current from a TFT exposed to light, without resorting to a black matrix placed an the opposite substrate.

DISCLOSURE OF THE INVENTION

To achieve the above objects, this invention is characterized by providing a substrate for a liquid crystal device as described in claim 1 comprising:

a plurality of data lines formed on the substrate;

a plurality of scan lines crossing the plurality of data lines;

a plurality of thin film transistors connected to the plurality of data lines and scan lines; and a plurality of pixel electrodes connected to the plurality of thin film transistors; wherein:

a first light shielding film formed at least below a channel region of the thin film transistor, and the junctions between the channel region and source/drain regions; and a second light shielding film formed above the channel region and the junctions between the channel region and the source/drain regions.

According to the substrate for a liquid crystal device, light impinging from above on the channel region and on the junctions between the channel region and the source/drain regions is shielded by the first shielding film, and light impinging from below is blocked by the second light shielding film. Through this arrangement, a leakage current which would otherwise be generated in the TFT exposed to light can be stably reduced.

The substrate for the liquid crystal device as described is characterized in that the first light shielding film may be a metal film selected from the group consisting of a tungsten film, titanium film, chromium film, tantalum film and molybdenum film, or an alloy film thereof.

According to the substrate for the liquid crystal device, when a metal film or a metal alloy film which is highly impenetrable to light and highly electrically conductive is used as a first light shielding film, it effectively acts as a light shielding film against reflective light from the back surface of the substrate for the liquid crystal device, and protects the channel region and the junctions between the channel region and the source/drain regions from exposure to light.

The substrate for the liquid crystal device as described is characterized in that a first lead extending from the first light shielding film is electrically connected to a constant potential line outside a pixel display region.

According to the substrate for the liquid crystal device, when the first light shielding film is formed in a floating state below the channel region of the TFT, irregular potential differences are generated between different terminals of the TFT, which may affect the TFT's performance. As a measure against such inconvenience, the first light shielding film must be stabilized at a specific potential level. This is the reason why the first lead extending from the first light shielding film is connected to a line having a constant potential such as a ground potential, outside a display region. This measure serves for inhibiting generation of potential differences among different terminals of the TFT, thus preventing alteration of TFT performance and occurrence of degraded display quality.

The substrate for the liquid crystal device as described is characterized in that the first lead extending from the first light shielding film is formed along and beneath the scan line.

According to the substrate for the liquid crystal device, the first lead extending from the first light shielding film is formed along and below the scan line. Through this arrangement it is possible for the lead to run without encroaching the aperture of the pixel. However, the first light shielding film is placed below the scan line and is positioned with respect to the side of scan line close to the aperture area of the pixel in such a way as to prohibit the direct impingement of incident light on the surface of first light shielding film.

The substrate for the liquid crystal device as described is characterized in that a width of the first lead extending from the first light shielding film is less than a width of the scan line formed above it.

The substrate for the liquid crystal device as described is characterized in that the first lead extending from the first light shielding film is covered by the scan line formed above it.

According to the substrate for the liquid crystal device as described, the scan line can prevent the first lead extending from the first light shielding film from being directly exposed to incident light and thus from reflecting incident light.

The substrate for the liquid crystal device as described is characterized in that a capacitance line which is formed on the same layer as that of the scan line to add a capacitance to the pixel is placed in parallel with the scan line, and has below it a second lead extending from the first light shielding film.

According to the substrate for the liquid crystal device as described, the second line extending from the first light shielding film, by being placed below the capacitance line which runs parallel with the scan line, and an added capacitor is formed by the second line, the drain region of the TFT and a first interlevel insulating film as a dielectric material. Through this arrangement it is possible to increase an extra capacitance without reducing the aperture of the pixel.

The substrate for the liquid crystal device as described is characterized in that a third lead extending from the first light shielding film is placed along and below a data line.

According to the substrate for the liquid crystal device as described, the third lead extending from the first light shielding film may be formed along and below the data line. This lead extension, however, should be arranged such that the first light shielding film placed below the data line is covered by the data line at the areas where the data line comes into contact with or comes very close to the pixel aperture region, in order to prevent the surface of the first light shielding film from being directly exposed to incident light.

The substrate for the liquid crystal device as described is characterized in that the data line also acts as a second light shielding film, and is made of any metal film selected from an aluminum film, tungsten film, titanium film, chromium film, tantalum film and molybdenum film, or an alloy film thereof.

According to the substrate for the liquid crystal device as described, preparing the data line from a metal film or a metal alloy film makes it possible for the data line to also act as a second light shielding film. This arrangement makes it unnecessary to prepare a layer only for light shielding.

The substrate for the liquid crystal device as described is characterized in that the third lead extending from the first light shielding film has a smaller width than that of data line.

The substrate for the liquid crystal device as described is characterized in that the channel region and the junction between the channel region forms and the source/drain region are placed beneath the data line, and that the first light shielding film placed beneath the channel region and the junction between the channel region and the source/drain region is covered by the data line at least on the part underlying the channel region and the junction between the channel region forms and the source/drain region.

According to the substrate for the liquid crystal device as described, at least the channel region and the junctions between the channel region and the source/drain regions are shielded by the data line (second light shielding film) from exposure to incident light from above. When incident light comes from above, it is necessary to protect the channel region and the junctions between the channel region and the source/drain regions from exposure to light reflected from the surface of the first light shielding film. To achieve this, the data line is formed in such a way as to totally cover the first light shielding film placed beneath the channel region and the junctions between the channel region and the source/drain regions.

The substrate for the liquid crystal device as described is characterized in that LDD regions are formed at the junctions between the channel region and the source/drain regions.

According to the substrate for the liquid crystal device as described, the junctions of the channel region with source/drain regions of a pixel TFT are prepared as LDD regions, which enables the reduction of a leakage current which would otherwise result when the TFT is turned off. However, when the LDD region is exposed to light, generally electrons within are readily excited. Thus, it is necessary to cover the LDD region with the first and second light shielding films from above and below, as is the case with the channel region.

The substrate for the liquid crystal device as described is characterized in that the junctions between the channel region and the source/drain regions are formed as offset regions.

According to the substrate for the liquid crystal device as described, the junctions between the channel region of the pixel TFT and the source/drain regions are formed as offset regions not doped with impurity ions, which enables the reduction of a leakage current which would otherwise result when the TFT is turned off. However, when the offset region is exposed to lights generally electrons within are readily excited as in the LDD region. Therefore, like the channel region, the offset regions are so formed as to be totally covered by the first and second light shielding films from above and below.

The substrate for the liquid crystal device as described above is characterized in that the scan line is made of any metal film selected from a tungsten film, titanium film, chromium film, tantalum film and molybdenum film, or of a metal alloy film thereof.

According to the substrate for the liquid crystal device as described, the scan line is made at least of a metal film or a metal alloy film which makes it possible for the scan line to also act as a light shielding film. Because through this arrangement it is possible for the scan line as well as the data line to act as a light shielding film, placement of a black matrix on the opposite substrate can be safely omitted, by forming all the sides surrounding the pixel electrode so as to overlap with the data lines and the scan lines.

The substrate for the liquid crystal device as described is characterized in that the smallest distance L1 from the lateral edges of first light shielding film to the channel region is made 0.2 $\mu m \leq L1 \leq 4$ $\mu m$.

According to the substrate for the liquid crystal device as described, it is possible to prevent adverse effects due to reflective light from the first light shielding film.

The substrate for the liquid crystal device as described is characterized in that the smallest distance L2 from the lateral edges of the second light shielding film to the lateral edges of first light shielding film is made 0.2 $\mu m \leq L2$.

According to the substrate for the liquid crystal device as described, it is possible to prevent adverse effects due to reflective light from the first light shielding film.

The substrate for the liquid crystal device as described is characterized in that the substrate for the liquid crystal device and an opposite substrate with an opposite electrode are placed with a specified interval in between, and that liquid crystal is inserted into the space between the substrate for the liquid crystal device and the opposite substrate.

According to the substrate for the liquid crystal device as described, the substrate for the liquid crystal device and the opposite substrate are bonded together by a specified cell gap, liquid crystal is injected into the space between the substrate for the liquid crystal device and the opposite substrate, and a voltage is applied across the liquid crystal to achieve a gray scale. This liquid crystal device, as long as it receives incident light only through the opposite substrate, ensures a high grade display of images free from adverse effects due to stray light.

The liquid crystal device as described is characterized in that a third light shielding film is formed on the opposite substrate.

According to the liquid crystal device as described, on the opposite substrate is formed a black matrix (third light shielding film) with a high light shielding property which is made of a metal film such as chromium film or a black matrix composed of an organic substance. The pixel TFT placed on the substrate for the liquid crystal device is prevented by the black matrix from being directly exposed to light. This arrangement makes it possible to provide a liquid crystal device with a display capable of reproducing high quality images.

The liquid crystal device as described is characterized in that the third light shielding film covers at least the first light shielding film.

According to the liquid crystal device as described, the first light shielding film placed on the substrate for the liquid crystal device is covered by the black matrix (third light shielding film) on the opposite substrate, which makes it possible for the first light shielding film to be shielded from direct exposure to incident light. This arrangement prevents light reflected from the surface of light shielding film from impinging on the channel region of the TFT and the junctions between the channel region and the source/drain regions, which enables the reduction of a leakage current which would otherwise arise if the TFT were exposed to light.

The liquid crystal device as described is characterized in that small lenses are arranged in the form of a matrix on the opposite electrode in correspondence with the plurality of pixel electrodes placed on the substrate for the liquid crystal display device.

According to the liquid crystal device as described, the small lens mounted on the opposite electrode converges light onto the pixel aperture region on the substrate for the liquid crystal device. The first light shielding film is placed on the substrate for the liquid crystal device such that light converged by the small lens, even when reflected from the back surface of the substrate for the liquid crystal device, is prevented from impinging on the channel region of the pixel TFT. Accordingly, even when light is converged by the small lens into a strong flux, it does not affect the TFT performance, and thus production of a liquid crystal device capable of reproducing bright, high quality images will be ensured.

The projection type display system as described in claim 21 is characterized by comprising a light source, a liquid crystal device to transmit or reflect light from the light source, after having modulated it, and an optical projection means which receives the modulated light sent from the liquid crystal device, and converges and enlarges it through projection.

According to the projection type display system as described, the projection type display system has a liquid crystal device of this invention, and can prevent the entry of stray light through the first light shielding film on the substrate for the liquid crystal device, even when the back surface of the substrate for the liquid crystal device is exposed to such light as reflected from a dichroic prism or the like. Accordingly, even when light is intensified and such intensified light is incident on the liquid crystal device, it does not affect the TFT performance, and thus production of a projection type display system capable of reproducing bright, high quality images will be ensured.

Operation and other advantages of this invention will be clearly described with reference to preferred embodiments given below.

Figure 1:
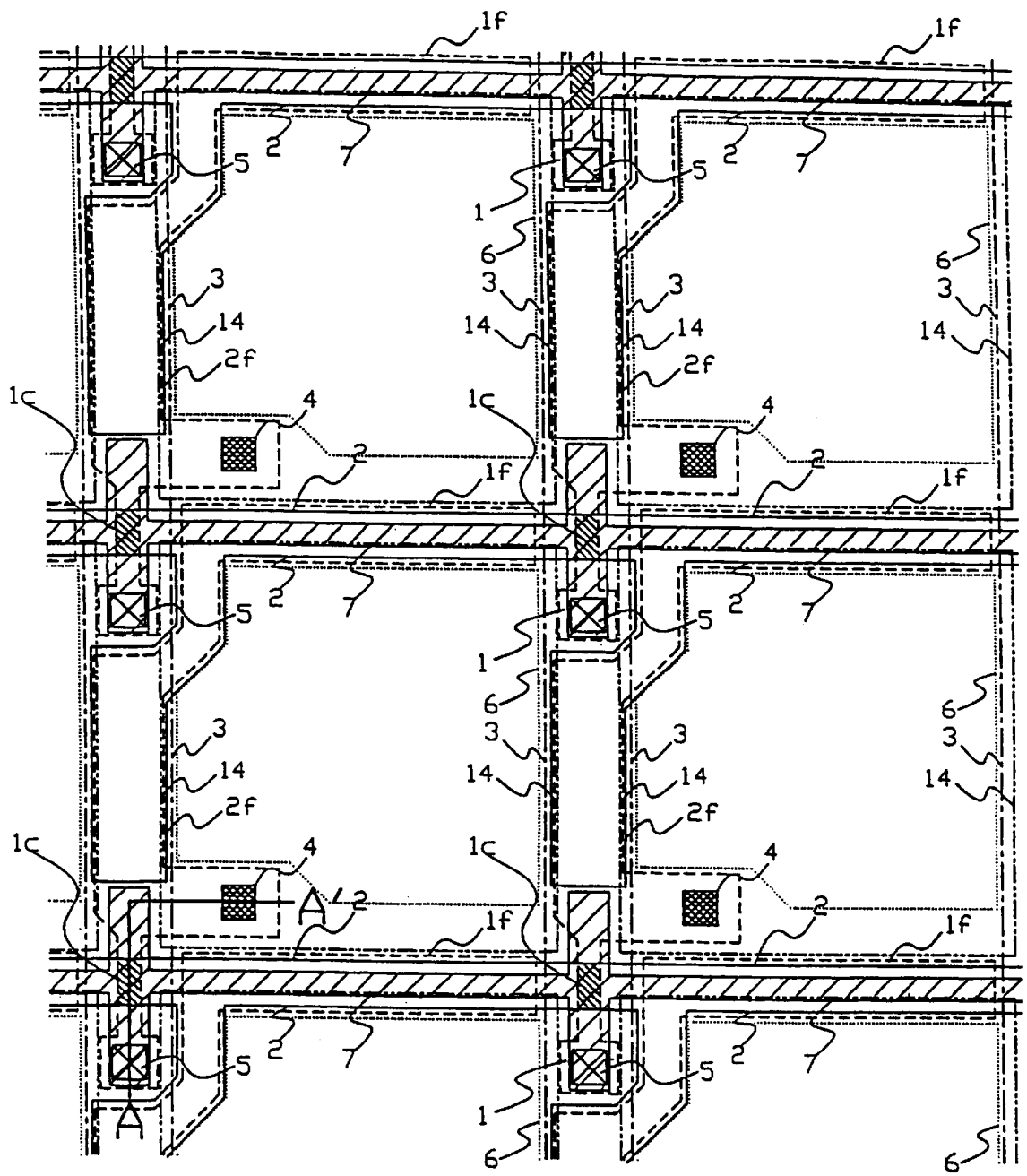
FIG. 1 is a plan view of pixels which represent the first embodiment of a substrate for a liquid crystal device to which this invention has been applied.

1: Semiconductor layer
2: Scan line (gate electrode)
3: Data line (second light shielding film)
4: Contact hole connecting pixel electrode and drain region
5: Contact hole connecting data line and source region
6: Black matrix on the opposite substrate (third light shielding film)
7: First light shielding film
10: Substrate
11: First interlevel insulating film
12: Gate insulating film
13: Second interlevel insulating film
14: Pixel electrode
15: Third interlevel insulating film
16: Capacitance line
17: Resistor mask
20: Display region
30: Liquid crystal device
31: Opposite substrate
32: Substrate for liquid crystal device
33: Opposite electrode
36: Sealing layer
37: Liquid crystal
38: Injection port of liquid crystal
39; Sealing material
40: Input/output terminals
50: Data line driving circuit
51: X shift register
52; Sampling switch
53: X buffer
54–56: Image signal lines
60: Scan line driving circuit
61: Y shift register
63: Y buffer
80: Small lens
90: Pixel
91: Pixel TFT
370: Light source
373, 375, 376: Dichroic mirror
374, 377: Reflection mirror
378, 379, 380: Light valve
383: Dichroic prism
384: Projection lens

DESCRIPTION OF THE BEST MODE

Preferred embodiments of this invention will be described below with reference to attached figures.

Embodiment 1

Figure 2:
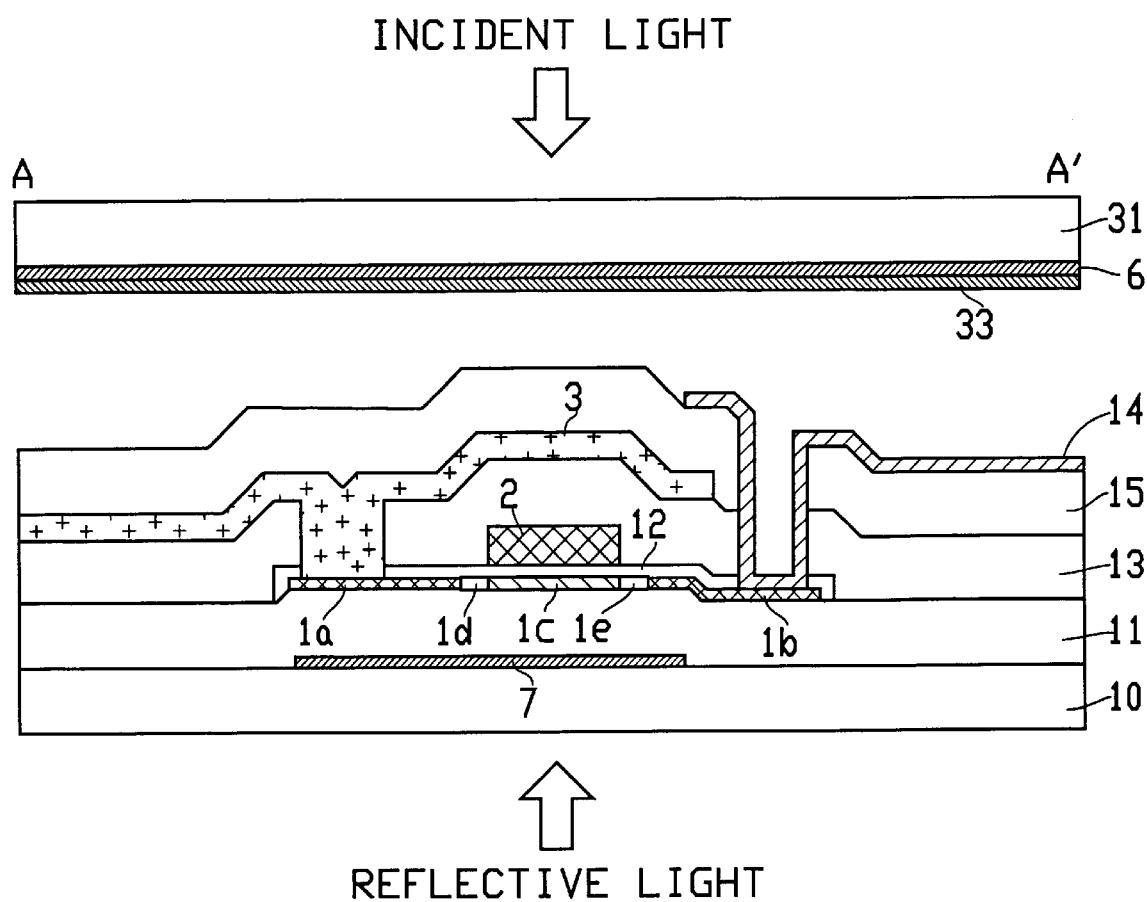
FIG. 2 is a sectional view of a pixel cut along the line A–A' of FIG. 1.

FIGS. 1 and 2 represent the first preferred embodiment of a substrate for a liquid crystal device to which this invention has been applied. FIG. 1 is a plan view of pixels arrayed side by side, while FIG. 2 is a sectional view of the same along line A–A' of FIG. 1, that is, a cross-section of a semiconductor layer 1 which serves as an active layer of a TFT.

In FIG. 1, 1 represents a polysilicon film which forms a first layer of the semiconductor layer of the TFT, and, on the surface of semiconductor layer 1 is formed a gate insulating film 12 which has been produced by thermal oxidation, as shown in FIG. 2. Scan lines 2 act as common gate electrodes to TFTs arrayed in the same column (arrayed crosswise in the figure), 3 represents a data line which is so placed lengthwise as to intersect the scan line 2 at right angles, and is introduced to provide a voltage to the source regions of the TFTs arrayed in a vertical direction along the same row. The scan line 2 is made of a polysilicon film which forms a second layer, and the data line 3 is made of an electroconductive layer such as an aluminum film.

Further, 4 represents a contact hole which is to connect a pixel electrode 14 made of an electroconductive layer such as an ITO film and the drain region of the first semiconductor layer 1 of the TFT, and 5 represents another contact hole which is to connect the data line 3 and the source region of first semiconductor layer 1 of the TFT. A black matrix 6 (third light shielding film) is implemented on an opposite substrate 31 to face the scan line 2 and data line 3, and consists of a metal film such as a chromium film or a black organic film or the like.

In this first embodiment, below the semiconductor layer 1 which acts as an active layer of the TFT, particularly below a channel region 1*c* (an area shaded with parallel lines with a negative gradient in FIG. 1), and junctions between LDD regions (or offset regions) 1*d* and 1*e*, and source/drain regions 1*a* and 1*b*, and the scan line 2, is placed a first light shielding film 7 (an area shaded with parallel lines with a positive gradient in FIG. 1) which is made of a metal such as tungsten, titanium, chromium, tantalum or molybdenum, or their alloy. As is evident from above, the semiconductor layer 1 is inserted between the first light shielding film 7 on one hand, and the second light shielding film (data line) 3 and the third light shielding film (black matrix) 6 on the other, and sandwiched from above and below with those films. Therefore, not only incident light from above but light reflected from the back surface of the substrate for the liquid crystal device can be prevented from impinging on the elements of the TFT, particularly on the channel region 1*c*, and the junctions between LDD regions 1*d* and 1*e* (or offset regions) and source/drain regions 1*a* and 1*b*. Thus, generation of a leakage current can be successfully suppressed. Furthermore, even if, when the substrate for the liquid crystal device and the opposite substrate are bonded together, alignment of the display region of the substrate for the liquid crystal device with respect to the black matrix 6 (third light shielding film) on the opposite substrate 31 takes place with a more or less error, incident light will not directly impinge on the channel region 1*c* and LDD regions 1*d* and 1*e* (or offset regions) of the TFT, and on the first light shielding film 7, because the channel region 1c and LDD regions 1d and 1e (or offset regions) of the TFT are masked with the second light shielding film 3 (data line). This arrangement allows a great reduction of leakage current which would be otherwise generated in the TFT exposed to stray light.

The reason why the first light shielding film 7 is extended so far as to underlie the scan line 2 is to provide the first light shielding film 7 just beneath the channel region 1c which absolutely demands light shielding, with a constant potential like a ground potential, thereby keeping the first light shielding film 7 from taking a floating state. This arrangement prevents fluctuations of TFT performance. The constant potential may be connected to a constant potential line (not illustrated here) such as a negative power source which is connected to a peripheral driving circuit mounted on the same substrate through the same process responsible for the formation of pixels. Particularly when the constant potential is so chosen as to give the same low level voltage with that of a gate signal provided to the scan line 2, it will prevent the occurrence of fluctuations in TFT performance. As seen from the context of the above discussion, it is most effective to electrically connect the shielding film in question to a negative power source (not illustrated here) of a scan line driving circuit to activate the scan line 2.

Further, the first light shielding film below the scan line 2 is preferably placed, with respect to the side of scan line 2 close to a pixel aperture, below the inside of scan line 2 rather than below the side of the same line 2. Through this arrangement it becomes possible to prevent the occurrence of light reflection from the first light shielding film 7 below the scan line 2. Furthermore, the first light shielding film 7 is preferably treated with an oxidative agent to give a surface sufficiently rough to diffuse reflective light, or is made of a polysilicon film, thereby preventing the occurrence of reflective light.

In this first embodiment, at least the channel region 1c, and LDD regions (or offset regions) 1d and 1e of the TFT are placed below the data line 3 (second light shielding film). Hence, as the channel region 1c is completely covered by the data line 3 (second light shielding film), direct impingement of incident light on the channel region 1c can be securely prevented.

In Embodiment 1, though not being restrictive, to efficiently confer an extra capacitance to the drain of the TFT, the channel region 1c of the first layer of semiconductor layer 1 takes a course as indicated by symbol 1f: it extends above along the data line 3, and flexes towards its own pixel electrode 14 along the scan line 2 of the pixel of the foregoing array (upper array in FIG. 1). Then, a part of scan line 2 of the foregoing array is allowed to take a downward course similarly to above along the data line 3 as indicated by symbol 2f. Through this arrangement, a capacitance (with the gate insulating film 12 as a dielectric body) between the extension 1f of the first layer of semiconductor layer 1 and the extension 2f of scan line 2 is connected as an extra capacitance to the drain of the TFT which gives a voltage to individual pixel electrodes 14. The thus added extra capacitance can minimize the adverse effects of input voltage alterations on the pixel aperture. Accordingly, with this arrangement, it is possible not only to maintain the pixel aperture at a high level, but to obtain an increased extra capacitance.

Next, by means of FIG. 2 which gives a sectional view of the semiconductor layer 1 approximately representing its profile from the contact hole 4 to contact hole 5 of FIG. 1, the sectional structure of pixel TFT of this invention will be described in detail. A substrate 10 is made of non-alkali glass or quartz, 11 is a first interlevel insulating film inserted between the TFT semiconductor layer 1 and first light shielding film 7, and made of a silicon oxide or silicon nitride film, and has been prepared by high pressure CVD or the like. Further, 12 is a gate insulating film, 13 a second interlevel insulating film, 15 a third interlevel insulating film and 14 is a pixel electrode made of an ITO film or the like.

In this first embodiment, the TFT as a switching element of the pixel has an LDD structure (or offset structure). Namely, the source/drain region consists of LDD regions (or offset regions) 1d and 1e, and source/drain regions 1a and 1b. Below the gate electrode 2 is positioned a channel region 1c. As is evident from FIG. 2, part of drain region 1b is not covered by the first light shielding layer 7, and hence the semiconductor layer 1 has a step at a junction where a portion covered by the first light shielding layer 7 comes into contact with the remaining portion which is not covered by the first light shielding layer 7. As this step is several microns apart from the junction between the drain region 1b and LDD region 1e, or, as this step is several microns apart from the junction in question towards the drain, the existence of this step does not affect the performance of the TFT. By allowing the TFT to have an LDD structure or an offset structure, it is possible to further reduce a leakage current generated during the switching-off of the TFT which would otherwise become considerable. Although the TFT described above is assumed to have an LDD structure (or offset structure), of course it may have a self-aligned structure which forms source and drain regions in a self-aligned manner with the gate electrode 2 as a mask.

Further, according to this first embodiment, the first light shielding film 7 is so formed as to cover from below the source/drain regions 1a and 1b, and junctions between channel region 1c and LDD regions (or offset regions) of semiconductor layer 1, and the data line 3 (second light shielding film) is also so formed as to cover from above the channel region 1c and LDD regions 1d and 1e (or offset regions). Therefore, the channel region 1c and LDD regions 1d and 1e (or offset regions) are covered doubly from light, that is, from incident light coming from above and reflective light coming from below. Furthermore, as the data line 3 (second light shielding film) covers from above the first light shielding film 7 at regions where the data line 3 runs in contact with or very close to the pixel aperture area, it is possible to prevent the reflection of incident light from the surface of first shielding film 7.

In addition to above, because a black matrix 6 (third light shielding film) coated on the opposite electrode 31 is so formed as to cover from above the channel region 1c and LDD regions 1d and 1e (or offset regions), light shielding of the channel region 1c and LDD regions 1d and 1e (or offset regions) is further strengthened. In addition, because the black matrix 6 (third light shielding film) covers the first light shielding film 7 with ample margins, it further effectively prevents direct impingement of incident light on the first light shielding film. Accordingly, with a liquid crystal device incorporating a substrate for the liquid crystal device of this invention, incident light is prevented from being reflected from the first light shielding film 7 and from impinging on the channel region 1c and LDD regions 1d and 1e (or offset regions), and hence it is possible to minimize a leakage current of the TFT which otherwise would be generated if it were exposed to stray light. Thus, such device can present a display of high quality images free from image degrading effects such as cross-talk.

Production process

Figure 3:
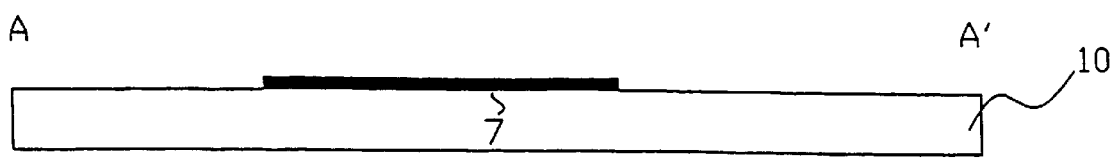
FIG. 3(a)–3(e) are series of sectional views illustrating the processes (front half) necessary for production of a substrate for a liquid crystal device of the first embodiment which are arranged in order.
Figure 3:
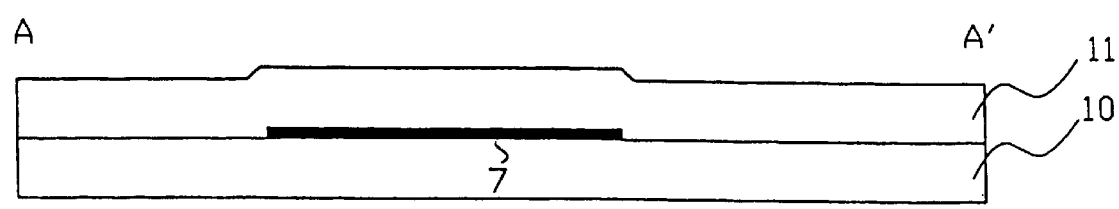
Figure 3:
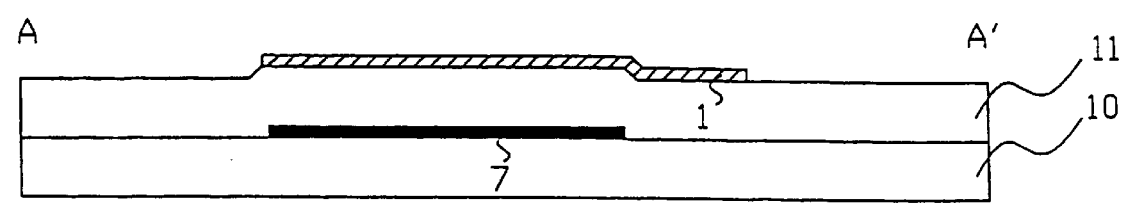
Figure 3:
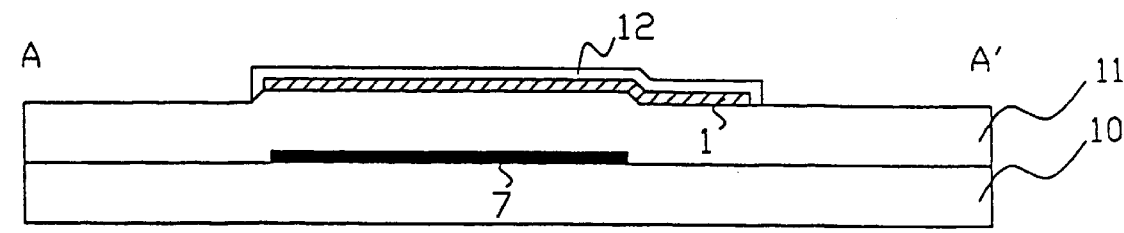
Figure 3:
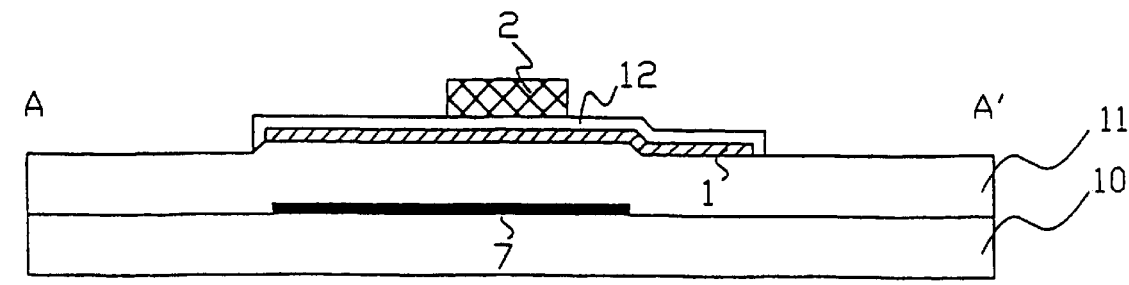

Next, by means of FIGS. 3 and 4, the production process of this invention will be described. First, on a substrate 10 made of non-alkali glass or quartz is formed by sputtering or the like an electroconductive film such as a tungsten films a titanium film, a chromium film, a tantalum film, or a molybdenum film or an alloy film such as metal silicide with a thickness of about 500–3,000 Å, or more preferably 1,000–2,000 Å. Then, a pattern is printed thereupon by photolithography or photoetching to form the first light shielding film 7 (FIG. 3a). This first light shielding film 7 is so formed as to cover from below at least the channel region 1c and LDD regions 1d and 1e (or offset regions) of the TFT which is to be produced in a later process. The first light shielding film may be a film made of an organic substance as long as it absorbs incident light. Further, in order to prevent the first light shielding film 7 from giving from its surface a strong reflective ray, the surface of first light shielding film 7 may be submitted to an oxidation treatment to become rough and thus to disperse reflective light diffusely. Alternatively, the first light shielding film 7 may have a double-layered structure by having another layer of polysilicon coated on the first film so that incident light may be absorbed by the polysilicon film.

Then, on the first light shielding film 7 is formed the first interlevel insulating film 11 so as to have a thickness of about 1,000–15,000 Å, or more preferably 5,000–10,000 Å (FIG. 3b). The first interlevel insulating film 11 is to insulate the first insulating film 7 from the semiconductor layer 1, and is formed by normal pressure CVD or by TEOS gas method and composed of a silicon oxide film or a silicon nitride film.

Following the formation of first interlevel insulating film 11, while the substrate 10 is being heated at about 500° C., monosilane gas or disilane gas is supplied at a flow rate of about 400–600 cc/min under a pressure of about 20–40 Pa to form an amorphous silicon film on the first interlevel insulating film 11. Then, it is subjecgted to annealing at the temperature of about 600 to 700° C. for about 1 to 72 hours under $N_2$ atmosphere and is grown in fixed phase to form a polysilicon film.

Later, photolithography or photoetching technique is applied to complete the semiconductor layer 1 of the TFT (FIG. 3c). This polysilicon film may be prepared by reduced pressure CVD or the like to have a thickness of about 500–2,000 Å, or more preferably about 1,000 Å, or it may be produced after a polysilicon layer deposited by reduced pressure CVD has been doped with silicon ions to be turned in an amorphous substance which is then recrystalized by annealing.

Next, the semiconductor layer 1 is oxidized by heating, to produce a semiconductor 1 overlaid with the gate insulating electrode 12 (FIG. 3d). Through this process, the semiconductor layer finally comes to have a thickness of 300–1,500 Å, more preferably about 350–450 Å while the gate insulating film comes to have a thickness of about 600–1,500 Å. Incidentally, when a substrate as large as an eight inch display is produced, to prevent the bending of the substrate during heating, the time for thermal oxidation is preferably shortened to allow the formation of a thin oxide film, upon which a high temperature silicon oxide film (HTO film) or a silicon nitrate film is deposited by CVD or the like, to form a laminar structure comprising two or more layers to act as an insulating film. The portion of the semiconductor layer made of polysilicon which extends upwards along the data line 3 to add an extra capacitance (1f in FIG. 1) is doped with an impurity such as phosphor at a dose of $3 \times 10^2/cm^{12}$, to reduce the resistance thereof. The lower limit of the dose can be determined by how much of the impurity is necessary to confer a necessary electroconductivity to allow a sufficient extra capacitance. On the other hand, the upper limit is determined by how much of the impurity is necessary for preventing degradation of the gate insulating film 12.

Next, a polysilicon film which acts as the gate electrode and scan line 2 is deposited on the semiconductor 1 with the gate insulating film 12 inserted in between, and a pattern is printed thereupon by photolithography or a photoetching technique (FIG. 3e). The gate electrode may be made of a polysilicon film or of a film made of a material capable of shielding light, that is, an electroconductive metal film such as a tungsten film, a titanium film, a chromium film, a tantalum film, a molybdenum film, or an alloy film such as metal silicide. Then, as it effectively prevents the entry of incident light to the channel region 1 and LDD regions 1d and 1e (or offset regions), the light shielding effect of the device is further improved. As this arrangement dispenses with the coating of black matrix 6 (third light shielding film) on the opposite matrix 31, it becomes possible to prevent the reduction of transmittance of the liquid crystal device which may result from imprecise bonding of the opposite substrate 31 to the substrate for the liquid crystal device.

Next, to form an N-channel TFT, impurity ions (e.g., phosphor ions) are implanted at a dose of about $0.1–10 \times 10^{13}/cm^2$ with the gate electrode 2 as a mask to form low-density regions (LDD regions) 1d and 1e (FIG. 3f).

Figure 4A:
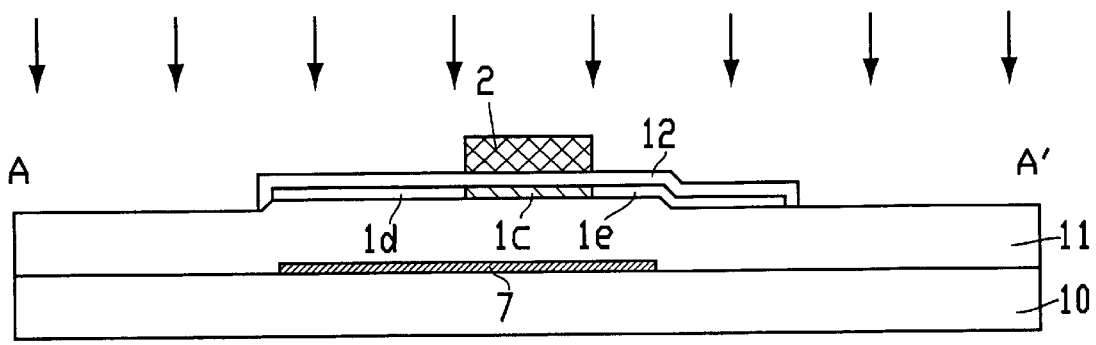
FIG. 4(a)–(d) are series of sectional views illustrating the processes (rear half) necessary for production of a substrate for a liquid crystal device of the first embodiment which are arranged in order.
Figure 4B:
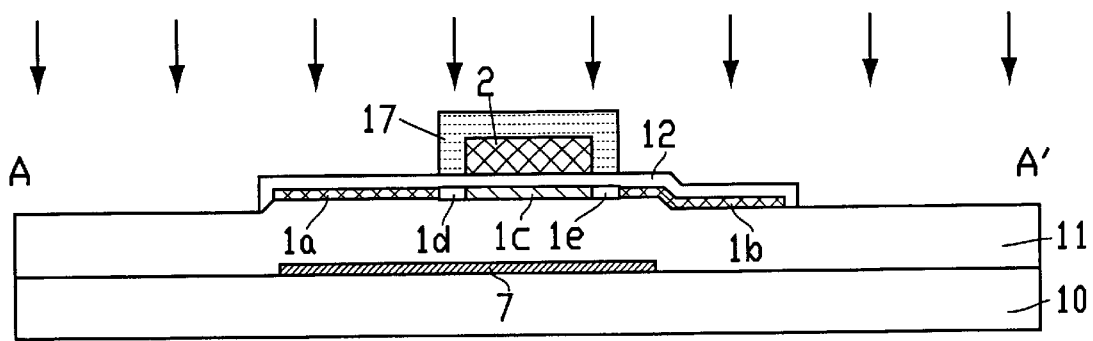
Figure 4C:
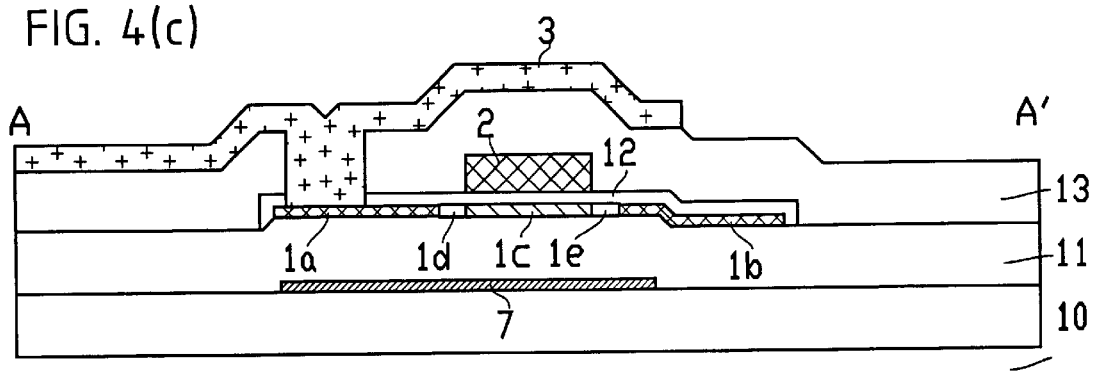
Figure 4D:
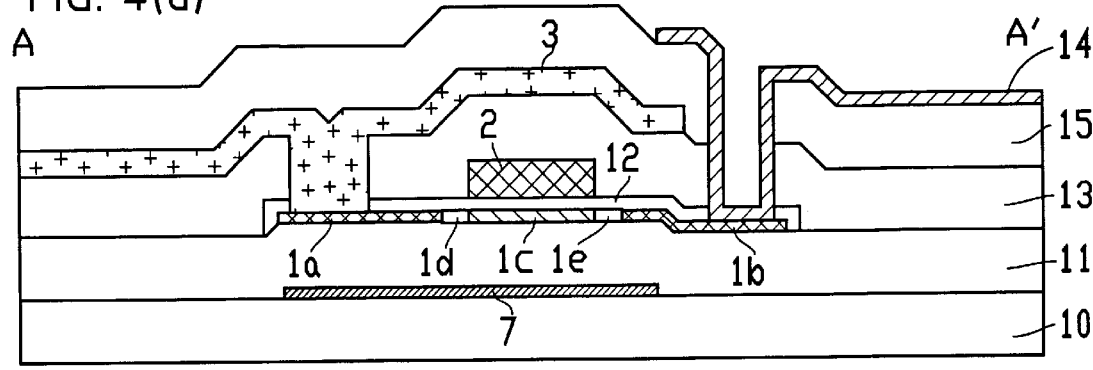

Further, a resist mask 17 having a larger width than that of gate electrode 2 is formed over the gate electrode 2, and impurity ions (e.g., phosphor ions) are implanted at a dose of about $0.1–10 \times 10^{15}/cm^2$ (FIG. 4g). Through this procedure, the masked regions become LDD regions. Namely, LDD regions 1d and 1e, and source/drain regions 1a and 1b are formed, and the channel region 1c is formed beneath the gate electrode 2. As is evident from above, when ions are implanted, the polysilicon film to act as the gate electrode 2 (scan line) is also doped with the impurity ions, and hence has its resistance reduced.

Instead of practicing the above process for introducing impurity ions, that is, instead of implanting a low concentration of impurity ions (e.g., phosphor ions), the resist mask 17 having a larger width than that of gate electrode 2 is formed over the gate electrode 2 and a high concentration of impurity ions (e g., phosphor ions) may be implanted to form N-channel source/drain regions 1a, 1b. Alternatively, a high concentration of impurity ions (e.g., phosphor ions) may be implanted with the gate electrode 2 as a mask to form n-channel source/drain regions with a self-aligning structure.

Further, though not illustrated here, to form a p-channel TFT of a peripheral driving circuit, the pixel TFT and N-channel TFT are covered with a resistor film for protection, and impurity ions (e.g., boron ions) are implanted at a dose of about $0.1–10 \times 10^{13}/cm^2$ with the gate electrode 2 as a mask, to produce low density regions 1d and 1e (LDD regions).

Furthermore, a resist mask 17 having a larger width than that of gate electrode 2 is formed over the gate electrode 2, and impurity ions (e.g., boron ions) are implanted at a dose of about $0.1–10 \times 10^{15}/cm^2$ (FIG. 4g). Through this procedure, the masked regions come to have a lightly doped drain (LDD) structure. Namely, LDD regions 1d and 1e, and source/drain regions 1a and 1b are formed, and the channel region 1c is formed beneath the gate electrode 2.

Instead of practicing the above process for introducing impurity ions, that is, instead of implanting a low concentration of impurity ions (e.g., boron ions), the resist mask 17 having a larger width than that of gate electrode 2 is allowed to form over the gate electrode 2, and a high concentration of impurity ions (e.g., boron ions) may be implanted to form P-channel source/drain regions with an offset structure. Alternatively, with the gate electrode 2 as a mask, a high concentration of impurity ions (e.g., boron ions) may be implanted to form N-channel source/drain regions with a self-aligned structure. Through these ion implantation processes, it is possible to produce a CMOS (complimentary MOS) TFT, and to build peripheral driving circuits together with pixel TFTs on the same substrate as the pixel TFT.

Later, the second interlevel insulating film 13 made of a silicon oxide film or a silicon nitride film is formed, for embodiment, by CVD over the whole surface of substrate 10 to cover the gate electrode 2 with a thickness of 5,000–15,000 Å. The second interlevel insulating film 13 is made of a silicon oxide film (NSG) or a silicon nitride film free from boron or phosphor. Then, after annealing to activate the source/drain regions, through the second interlevel insulating film 13 is opened a contact hole 5 by dry etching or the like which corresponds in position with the source region 1a of TFT. Then, by sputtering or the like, a metal film such as an aluminum film, a titanium film, a tungsten film, a tantalum film, a chromium film, a molybdenum film, etc., or an alloy film is formed thereupon so as to have a thickness of, for embodiment, 2,000–6,000 Å, which is then processed by a photolithography or etching techniques to give a patterning to the data line (second light shielding film). During this process, the data line 3 (second light shielding film) is connected to the semiconductor layer 1 (FIG. 4h) through the contact hole 5. In this process, the data line 3 (second light shielding film) is allowed to cover at least the channel region 1c and LDD regions 1d and 1e (or offset regions).

Then, the third interlevel insulating film 15 is formed, for embodiment, by CVD or normal pressure ozone TEOS over the whole surface of substrate 10 as if to cover the data line 3 with a thickness of 5,000–15,000 Å. The third interlevel insulating film 15 is made of a silicon oxide film (BPSG) or a silicon nitride film containing boron and phosphor. Or, it may have another coat made of an organic substance added using a spin coater to smooth its surface to be free from steps. When the above smoothing treatment is introduced during the formation of the third interlevel insulating film or a process just prior to the formation of pixel electrode 14, it is possible to minimize a lowering in contrast due to inappropriate arrangement of liquid crystal molecules. Then, through the third interlevel insulating film 15 is opened a contact hole 4 by dry etching or the like which contacts with the drain region 1b of the pixel TFT, and the pixel electrode 14 which is formed later is connected through this contact hole 4 to the semiconductor layer 1 (FIG. 4i).

The pixel electrode 14 is obtained after an ITO film has been formed by sputtering or the like so as to have a thickness of 400–2,000 Å, and is subjected to a patterning by a photolithography or etching technique. Then, an alignment film made of polyimide or the like is covered over the pixel electrode 14 and a third interlevel insulating film 15 so as to have a thickness of about 200–1,000 Å over the whole surface of substrate 10, and a rubbing (aligning treatment) is applied on the surface thereof to produce the substrate for liquid crystal device.

In embodiment 1, description has been made assuming that the TFT has an LDD structure, but it may have an offset structure, or it may have a self-aligned structure with the gate electrode as a mask. To let the TFT have an offset structure, the process depicted in FIG. 4f may be omitted. To let the TFT have a self-aligned structure, a high concentration of impurities are implanted during the process as depicted in FIG. 4f, and the process of FIG. 4g should be omitted.

Embodiment 2

Figure 5:
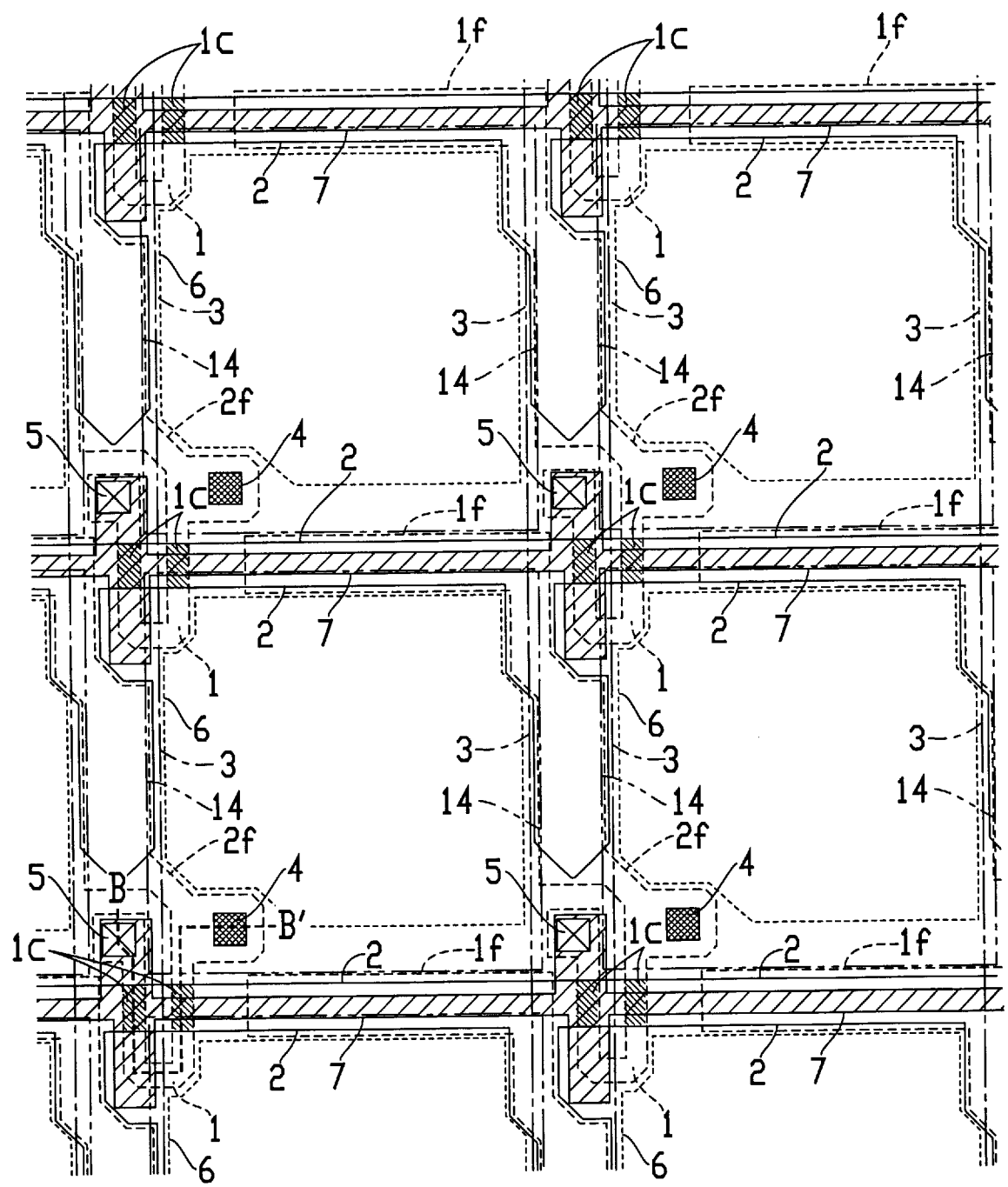
FIG. 5 is a plan view of pixels which represent the second embodiment of a substrate for a liquid crystal device to which this invention has been applied.
Figure 6:
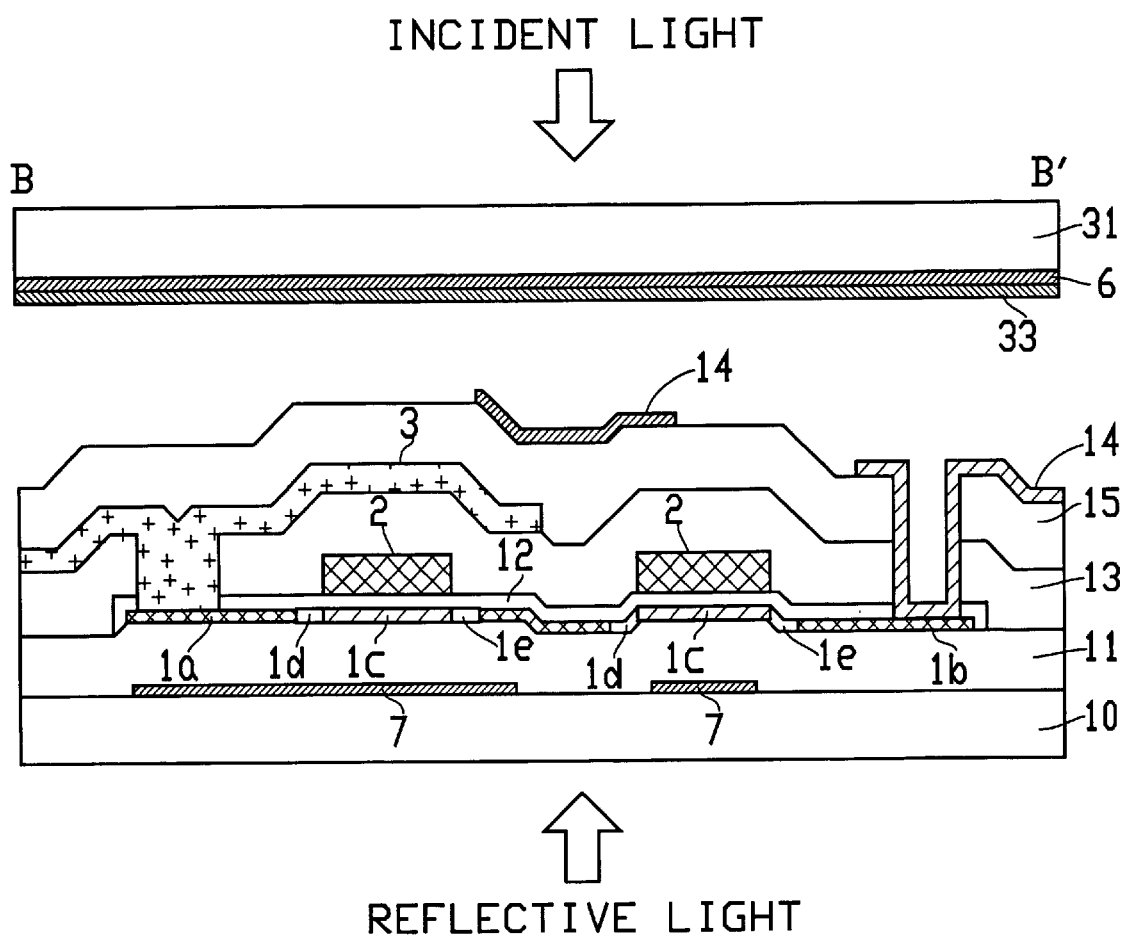
FIG. 6 is a sectional view of a pixel cut along the line B–B' of FIG. 1.

FIGS. 5 and 6 represent the second preferred embodiment of a substrate for a liquid crystal device to which this invention has been applied. FIG. 5 is a plan view of pixels arrayed side by side, while FIG. 6 is a sectional view of the same along line B–B' of FIG. 5, that is, a cross-section of a semiconductor layer 1 which serves as an active layer of the TFT. In embodiment 2, below the semiconductor layer 1 and scan line 2 is formed a first light shielding film 7 (areas shaded with parallel lines with a positive gradient in FIG. 5), and the semiconductor layer 1 is so prepared with respect to the scan line 2 as to intersect the latter two times within a pixel unit. Through this arrangement, it is possible to maintain the distance of the channel region 1c of pixel TFT from both contact holes constant even if the scan line 2 (gate electrode) (areas shaded with parallel lines with a negative gradient in FIG. 5) is displaced with respect to the semiconductor layer 1, and thus a lowering in display quality which would otherwise result can be effectively prevented. Further, for a given pixel, the semiconductor layer 1 to provide the channel region 1c of pixel TFT intersects twice with the scan line 2, and the channel regions 1c formed at those intersections are connected in series. Therefore, the resistance component of the pixel TFT is increased, which contributes to a lowering of the leakage current which would otherwise occur when the TFT is switched off.

Also in embodiment 2, the pixel TFT may have an LDD structure or an offset structure. It will be possible to further lessen the leakage current if the pixel TFT has an LDD structure or an offset structure, in addition to a dual gate structure or a triple gate structure. Further, in embodiment 2, one of two pairs of channel regions 1c and LDD regions 1d and 1e (left pair of FIG. 5) is placed beneath a data line 3 (second light shielding film) made of an aluminum film. Through this arrangement, it is possible for the data line 3 (second light shielding film) to act as a shielding film against incident light from above or light coming from the side where an opposite substrate 31 resides, and thus to prevent the light from directly impinging on the channel region 1c and LDD regions 1d and 1e (or offset regions) of the pixel TFT. Therefore, the leakage current can further be reduced. This contributes to further lessen the leakage current. In this arrangement, however, it is possible for the channel region 1c and LDD regions (or offset regions) (right pair of FIG. 5) which are not covered by the data line 3 (second light shielding film) to be exposed to incident light Nevertheless, because at least one of two channel regions connected in series is free from adverse effects due to stray light, no leakage current as a result of stray light would ensue, and further the TFT, having a dual gate structure, will give a lowered resistance when switched off.

In embodiment 2 like embodiment 1, the first light shielding film 7 is prepared smaller in size than a black matrix formed on an opposite substrate 31. Accordingly, incident light is prevented from impinging directly on the surface of first light shielding film 7, and thus generation of leakage current due to light reflected from the first light shielding film 7 can be effectively suppressed. Furthers the first light shielding film 7 is so prepared as to have a smaller width than does the scan line 2, thereby preventing direct impingement of incident light on the first light shielding film 7 which extends below the scan line 2 in the same direction.

In embodiment 1, though not being restrictive, to effectively confer an extra capacitance to the drain of the TFT, the channel region 1c of the first layer of semiconductor layer 1 takes a course as indicated by symbol 1f: it extends above along the data line 3, and flexes towards an adjacent pixel electrode 14 (of the left adjacent pixel in FIG. 5) along the scan line 2 of the pixel of the foregoing array (upper array in FIG. 5). Then, a part of scan line 2 of the foregoing array is allowed to take a downward course along the data line 3 as indicated by symbol 2f. Through this arrangement, a capacitance (with the gate insulating film 12 as a dielectric body) between the extension if or the first layer of semiconductor layer 1 and the extension 2f of scan line 2 is connected as an extra capacitance to the drain of the TFT which gives a voltage to individual pixel electrodes 14. The thus added extra capacitance can minimize the adverse effects of input voltage changes on the pixel aperture. Accordingly, with this arrangement, it is possible not only to maintain the pixel aperture at a high level, but to obtain an increased extra capacitance.

Further, embodiment 2 can be produced through the same production processes as used for the production of embodiment 1.

Embodiment 3

Figure 7:
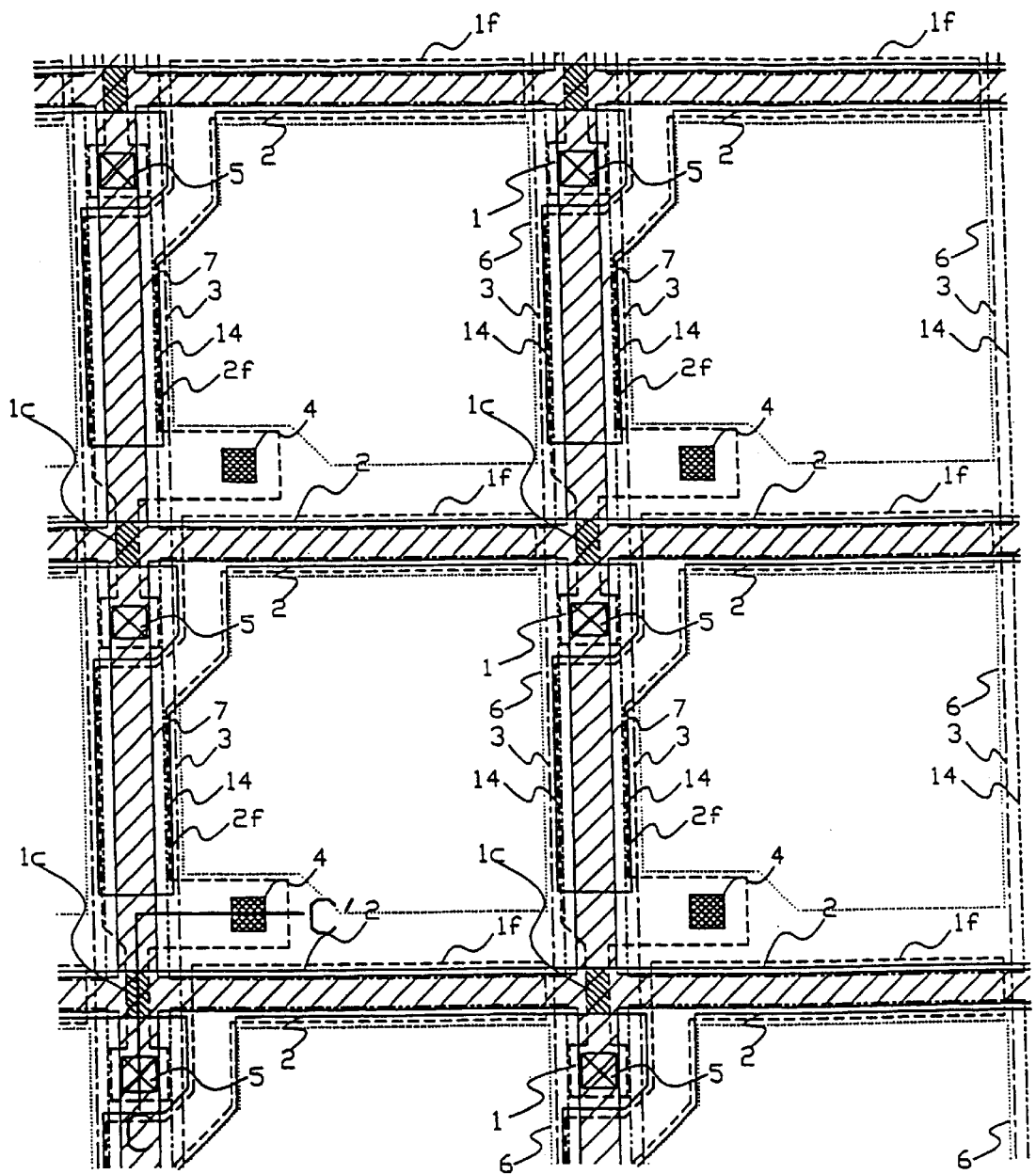
FIG. 7 is a plan view of pixels which represent the third embodiment of a substrate for a liquid crystal device to which this invention has been applied.
Figure 8:
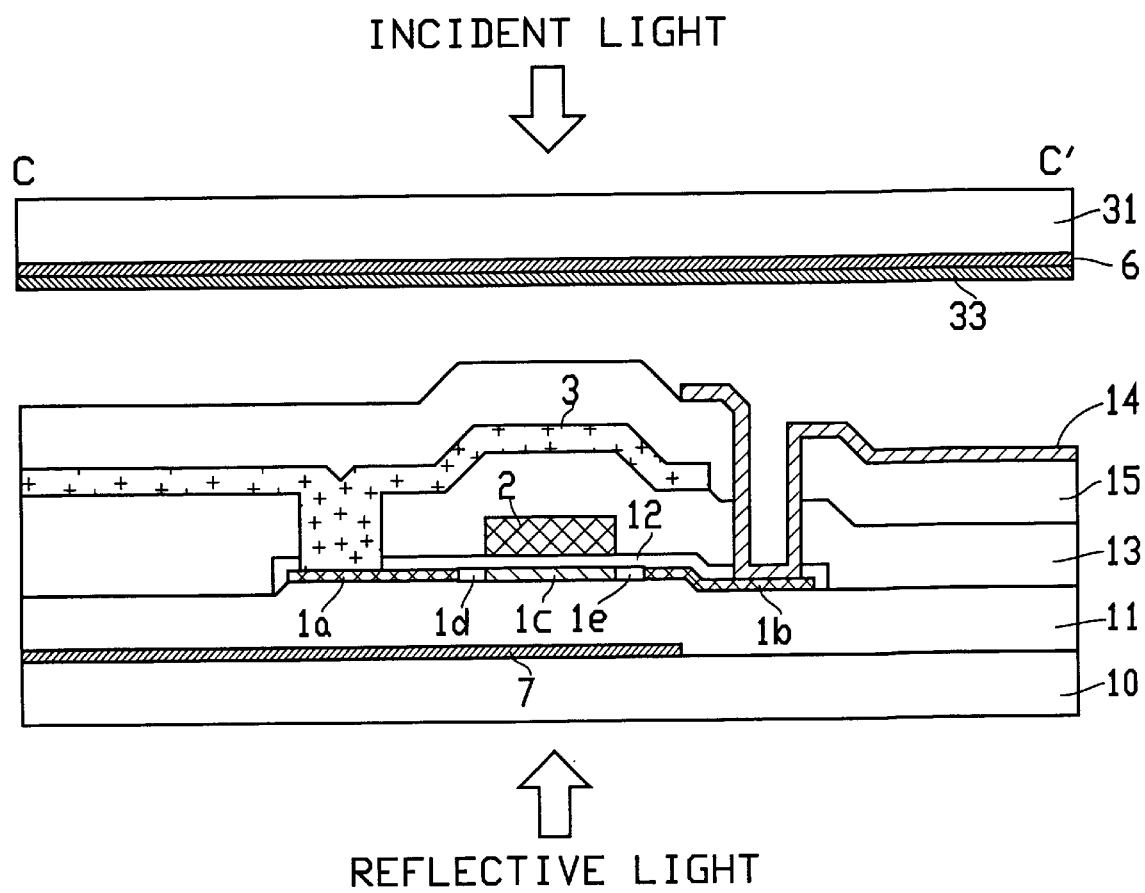
FIG. 8 is a sectional view of a pixel cut along the line C–C' of FIG. 7.

FIGS. 7 and 8 represent the third preferred embodiment of a substrate for a liquid crystal device to which this invention has been applied. FIG. 7 is a plan view of pixels arrayed side by side, while FIG. 8 is a sectional view of the same along line C–C' Of FIG. 7, that is, a cross-section of a semiconductor layer 1 which serves as an active layer of the TFT. Embodiment 3 differs from embodiment 1 in that a first shielding film 7 (area shaded with parallel lines having a positive gradient) is placed not only below a scan line 2 but below a data line 3. Namely, in embodiment 3, the first light shielding film 7 is allowed to run below the scan line 2 and data line 3 to form a matrix. Through this arrangement, it is possible for the first light shielding film to further reduce a wiring resistance by being electrically connected to a constant potential line such as a grounding potential line, and further to receive a constant potential even when wiring is disrupted by some foreign matters which by accident may fall onto the substrate during transportation for later processes. Accordingly, as the light shielding film has a low wiring resistance and a redundant structure, it is possible to obtain a display of high quality images free from cross-talk or the like.

In embodiment 3 like embodiment 1, below the channel regions 1c of pixel TFT (areas shaded with parallel lines having a negative gradient), and below the scan line 2 and data line 3, is placed the light shielding film 7 which is made of a metal film such as a tungsten film, a titanium film, a chromium film, a tantalum film or a molybdenum film, or a metal alloy film. Through this arrangement, it is possible for the scan line 2 and data line 3 (second light shielding film) to act as a shielding layer against incident light coming from the side where an opposite substrate 31 resides, and for the first light shielding film 7 to act as another shielding layer against light reflected from the back surface of substrate for the liquid crystal device. Thus light is prevented from directly impinging on the channel region 1c and LDD regions 1d and 1e (or offset regions) of the pixel TFT. This suppresses a leakage current which would otherwise result from the TFT exposed to stray light. In embodiment 2, furthermore, all the sides of the pixel electrode 14, that is, the sides running lengthwise in FIG. 7 are overlapped with data line 3, and the sides running crosswise are overlapped with first light shielding film 7 below the scan line 2, and are separated from the adjacent pixel electrode 14 on the data line 3 and the first light shielding film 7 beneath the scan line 2. This arrangement dispenses with the need for a black matrix 6 (third light shielding film) placed on the opposite substrate 31. According to an experiment done by the present inventors where a tungsten silicide film was used as the first light shielding film 7, and that film was so prepared as to have a thickness of about 2,000 Å. Then it was found out that, with an optical density of 3 or more, the film showed a light shielding activity as high as that which would be obtained if the device has a black matrix coated on the opposite substrate 31. This arrangement dispenses with the need for precise alignment of the black matrix 6 on the opposite substrate 31 against the substrate for the liquid crystal device when the two kinds of substrates are bonded together, and the thus obtained liquid crystal devices show little variation in light transmittance.

In embodiment 3, description has been given assuming that the data line 3 is placed like a matrix below the data line 3 and scan line 2. Needless to say, however, as long as a wire consisting of the first light shielding film 7 is arranged at least below the scan line 2 as in embodiment 1, use of a black matrix on the opposite substrate can be dispensed with.

Embodiment 3 can also be produced through the same production processes as used for the production of embodiment 1.

Embodiment 4

Figure 9:
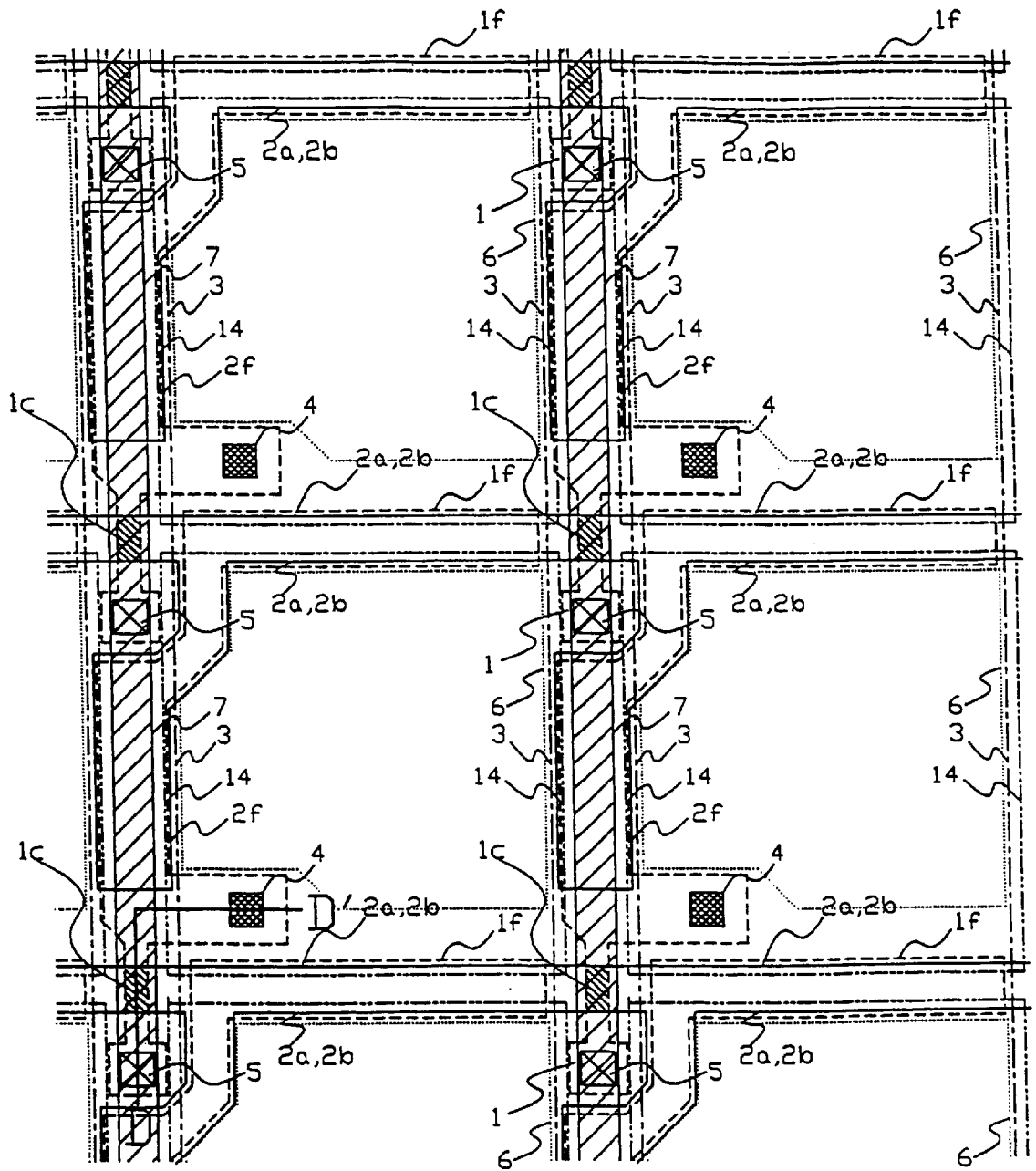
FIG. 9 is a plan view of pixels which represent the fourth embodiment of a substrate for a liquid crystal device to which this invention has been applied.
Figure 10:
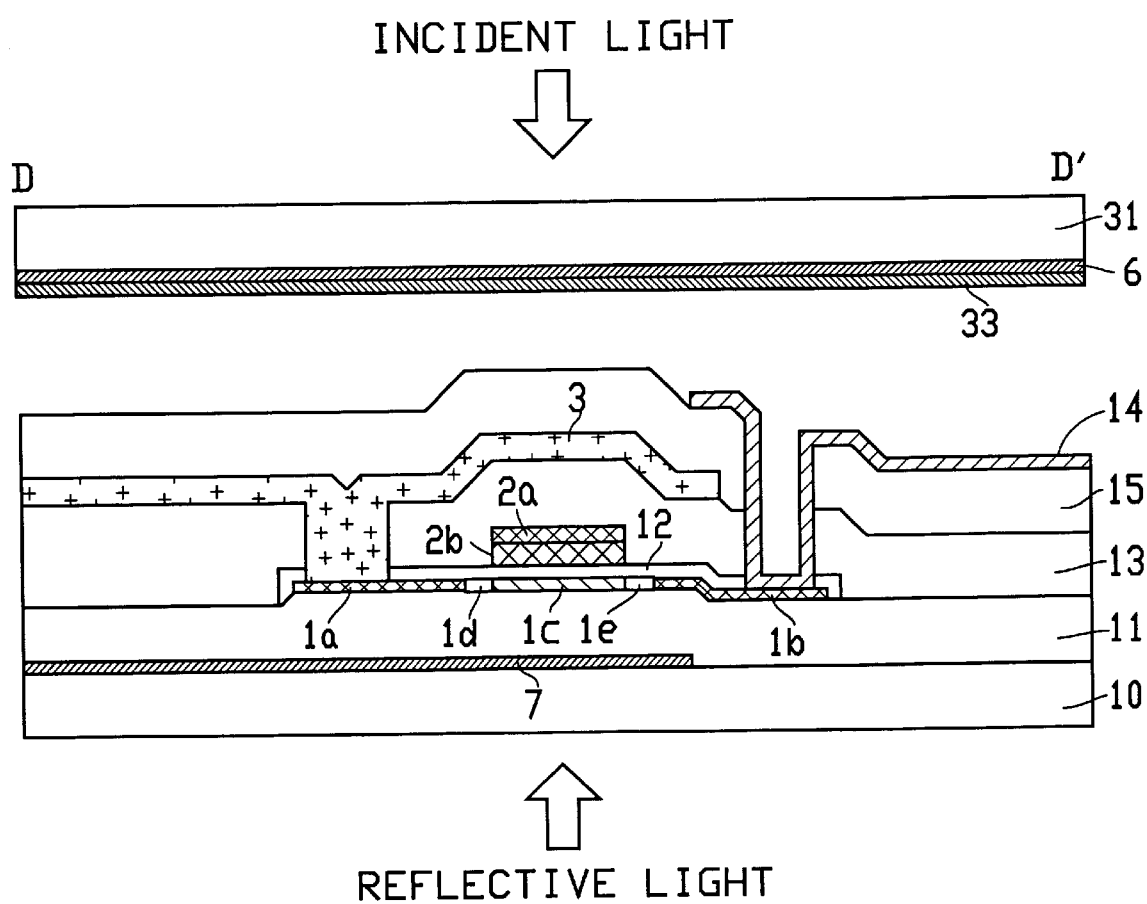
FIG. 10 is a sectional vies of a pixel cut along the line D–D' of FIG. 9.

FIGS. 9 and 10 represent the fourth preferred embodiment of a substrate for liquid crystal device to which this invention has been applied. FIG. 9 is a plan view of pixels arrayed side by side, while FIG. 10 is a sectional view of the same along line D–D' of FIG. 9, that is, a cross-section of a semiconductor layer 1 which serves as an active layer of the TFT. Embodiment 4 differs from embodiment 3 in that a scan line 2 has a laminated structure consisting of a polysilicon layer 2a and a metal film such as a tungsten film, a molybdenum film, etc., or a metal alloy film 2b, and in that the first light shielding film 7 (areas shaded with parallel lines having a positive gradient) is place only below a data line 3 (second light shielding film). In embodiment 3 described above, as a polysilicon film constituting the scan line 2 alone is present above the first light shielding film 7, the channel region 1c (areas shaded with parallel lines having a negative gradient) and LDD regions 1d and 1e (or offset regions) may be affected by incident light if they are too close to the pixel aperture. As a remedy to this problem, the scan line 2 is made of an opaque material such as a metal or a metal alloy. Namely, the sides of pixel electrode 14 running lengthwise in FIG. 9 are shielded from light by the data line 3, while the sides running crosswise in FIG. 9 are shielded from light by the scan line 2. Accordingly, although, in embodiment 4, the extension from the first light shielding film 7 is placed below the data line 3, the same may be placed only below the scan line 2 as in embodiment 1, or may be wired like a matrix as in embodiment 3.

Incidentally, the metal or metal alloy film 2b may be formed by sputtering, or may be formed after a metal film has been overlaid through vapor deposition on the polysilicon film 2a, and the assembly been submitted to a heating treatment to produce a metal silicide film. Further, the scan line 2 may have a multi-layers structure with three or more layers instead of double-layered structure as in the present embodiment. For embodiment, the scan line may be formed after a closely affinitive polysilicon film 2a is formed on a semiconductor layer 1, and a metal silicide layer 2b having a low electric resistance and made of tungsten silicide or the like is further placed over the assembly, and another polysilicon film is still further placed so as to cover the foregoing polysilicon film 2a and metal silicide film 2b. If the scan line 2 is composed of a metal or metal alloy film as described above, it will not only prevent the entry of stray light but reduce a wiring resistance which would be considerable if the scan line is made solely of polysilicon, and thus reduce delaying in signal transmission.

In embodiment 4 like embodiment 1, along the portion of data line (second light shielding film) which contacts with the pixel aperture or is very close to the same, the first light shielding film 7 placed below has a smaller width than does the data line 3 (second light shielding film). This is because the data line 3 acts as a shield against incident light, and thus, prevents the first light shielding film 7 from being exposed to light by having a larger width than that of the latter.

In embodiment 4, below the channel regions 1c and LDD regions 1d and 1e (or offset regions) of the pixel TFT, and below the data line 3, is placed the light shielding film 7 which is made of a metal silicide film such as tungsten silicide, and the scan line 2 has a laminar structure which contains a layer made of a metal or metal silicide film which is impenetrable to light. Through this arrangement, it is possible for the scan line 2 and data line 3 to act as a shielding layer against incident light coming from the side where an opposite substrate 31 resides, and for the first light shielding film 7 to act as another shielding layer against light reflected from the back surface of substrate. Thus reflective light is prevented from directly impinging on the channel region 1c and LDD regions 1d and 1e (or offset regions) of the pixel TFT. This suppresses a leakage current which would otherwise result from the TFT exposed to stray light. In embodiment 4 like embodiment 3, all the sides of the pixel electrode 14 are overlapped with data line 3 and scan line 2 and are separated from the adjacent pixel electrode 14 on the data line 3 and scan line 2. This arrangement dispenses with the need for a black matrix 6 to be placed on the opposite substrate 31 like embodiment 3.

Embodiment 4 can also be produced through the same production processes as used for the production of embodiment 1.

Embodiment 5

Figure 11:
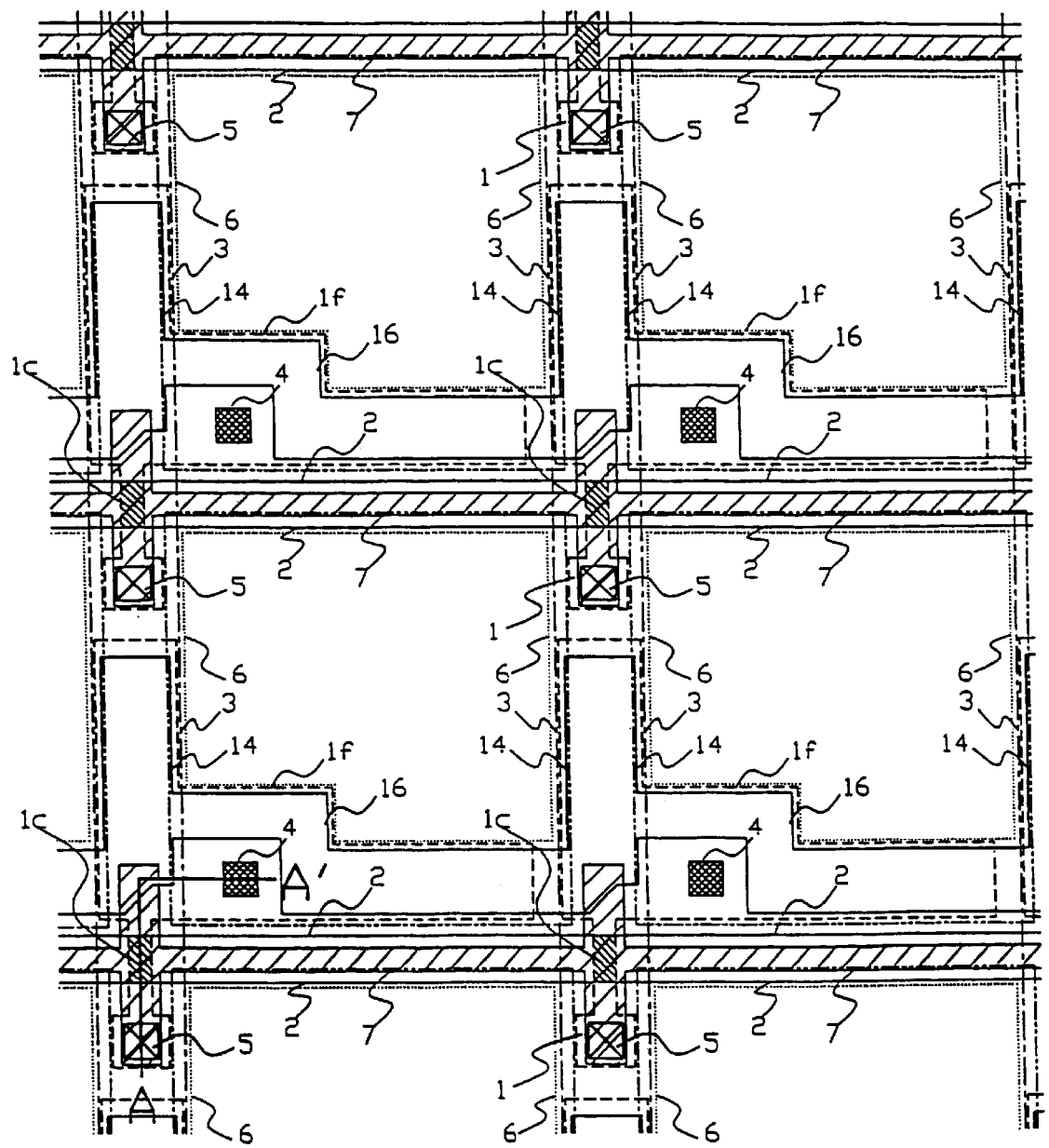
FIG. 11 is a plan view of pixels which represent the fifth embodiment of a substrate for a liquid crystal device to which this invention has been applied.

FIG. 11 represents the fifth preferred embodiment of a substrate for liquid crystal device to which this invention has been applied. FIG. 11 is a plan view of pixels arrayed side by side, and the cross-section along line A–A' of FIG. 11, or the sectional structure of a semiconductor layer 1 which acts as an active layer of the TFT is the same with that shown in embodiment 1 (FIG. 2). Embodiment 5, instead of placing a scan line 2 below a data line 3 to obtain an extra capacitance, implements a capacitance line 16 in parallel with the scan line 2, and places an extension 1f from the semiconductor layer 1 below the capacitance line, to add an extra capacitance. The capacitance line 16 is made of a polysilicon film which is produced through the same process responsible for the production of the scan line 2, and is fixed to a constant potential such as a ground potential outside the display area. If the constant potential is obtained from a constant potential line of a power source of an adjacent peripheral driving circuit, it will be cost-effective because introduction of terminals specially prepared for the purpose would become unnecessary. Further, the gate of the pixel TFT is single.

With a liquid crystal device incorporating a substrate with such a capacitance line, it is necessary to let a black matrix applied onto an opposite substrate 31 have a large area, because the capacitance line 6 must be shielded from light. As there is a considerable distance between the pixel aperture along the capacitance line 16 and the channel region 1c (areas shaded with parallel lines having a negative gradient in FIG. 11) of the pixel TFT, adverse effects due to incident light from this side will be negligible. Accordingly, what is suspected of bringing adverse effects associated with incident light only involves the pixel aperture along the scan line 2. Thus, this arrangement can halve a leakage current which would otherwise result from incident light.

Embodiment 5 can also be produced through the same production processes as used for the production of embodiment 1.

Embodiment 6

Figure 12:
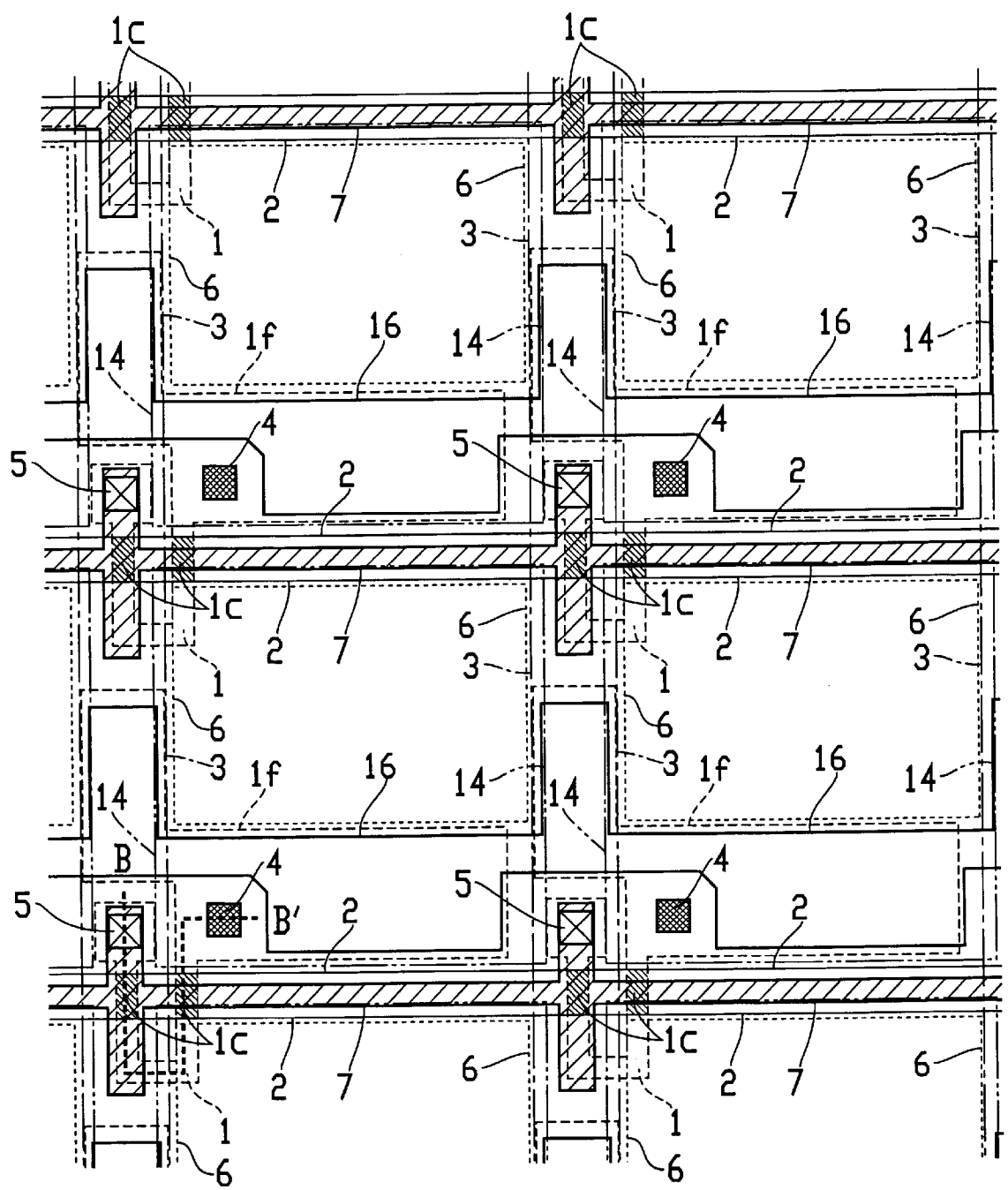
FIG. 12 is a plan view of pixels which represent the sixth embodiment of a substrate for a liquid crystal device to which this invention has been applied.

FIG. 12 represents the sixth preferred embodiment of a substrate for liquid crystal device to which this invention has been applied. FIG. 12 is a plan view of pixels arrayed side by side, and the cross-section along line B–B' of FIG. 12, or the sectional structure of a semiconductor layer 1 which acts as an active layer of the TFT is the same with that shown in embodiment 2 (FIG. 6). In embodiment 6, like embodiment 5, a capacitance line 16 in parallel with a scan line 2 is implemented, and an extension 1f from the semiconductor layer 1 is implemented below the capacitance line 16 to add an extra capacitance. The semiconductor layer 1 of the pixel TFT is shaped like a letter U, and a gate electrode has a dual gate formation. The capacitance line 16 is made of a second polysilicon film which has been produced by the same process responsible for the production of the scan line 2, and is connected to a constant potential line such as a ground line outside the pixel region. As is evident from above, in embodiment 6, as the capacitance line 16 must be shielded from light, it is necessary for a black matrix placed on an opposite substrate 31 to have a sufficiently large area. As there is a considerable distance between the pixel aperture along the capacitance line 16 and the channel region 1c (areas shaded with parallel lines having a negative gradient in FIG. 12) of the pixel TFT, adverse effects due to incident light from this side will be negligible. Accordingly, what is suspected of bringing adverse effects associated with incident light only involves the pixel aperture along the scan line 2. Thus, this arrangement can halve a leakage current which would otherwise result from incident light.

Further, as the gate electrode of the pixel TFT has a dual gate structure, the TFT comes to have a large resistance when turned off, which contributes to a further reduction of leakage current. Furthermore, in FIG. 12, like embodiment 2, only one out of two channel regions 1c is placed below the data line 3 (second light shielding film), but as long as one channel region 1c is shielded from light by the data line 3, a leakage current resulting from the TFT exposed to light can be suppressed.

Embodiment 6 can also be produced through the same production processes as used for the production of embodiment 1.

Embodiment 7 and Determination of the Size of Light Shielding Films Around a Data Line 3

Figure 13:
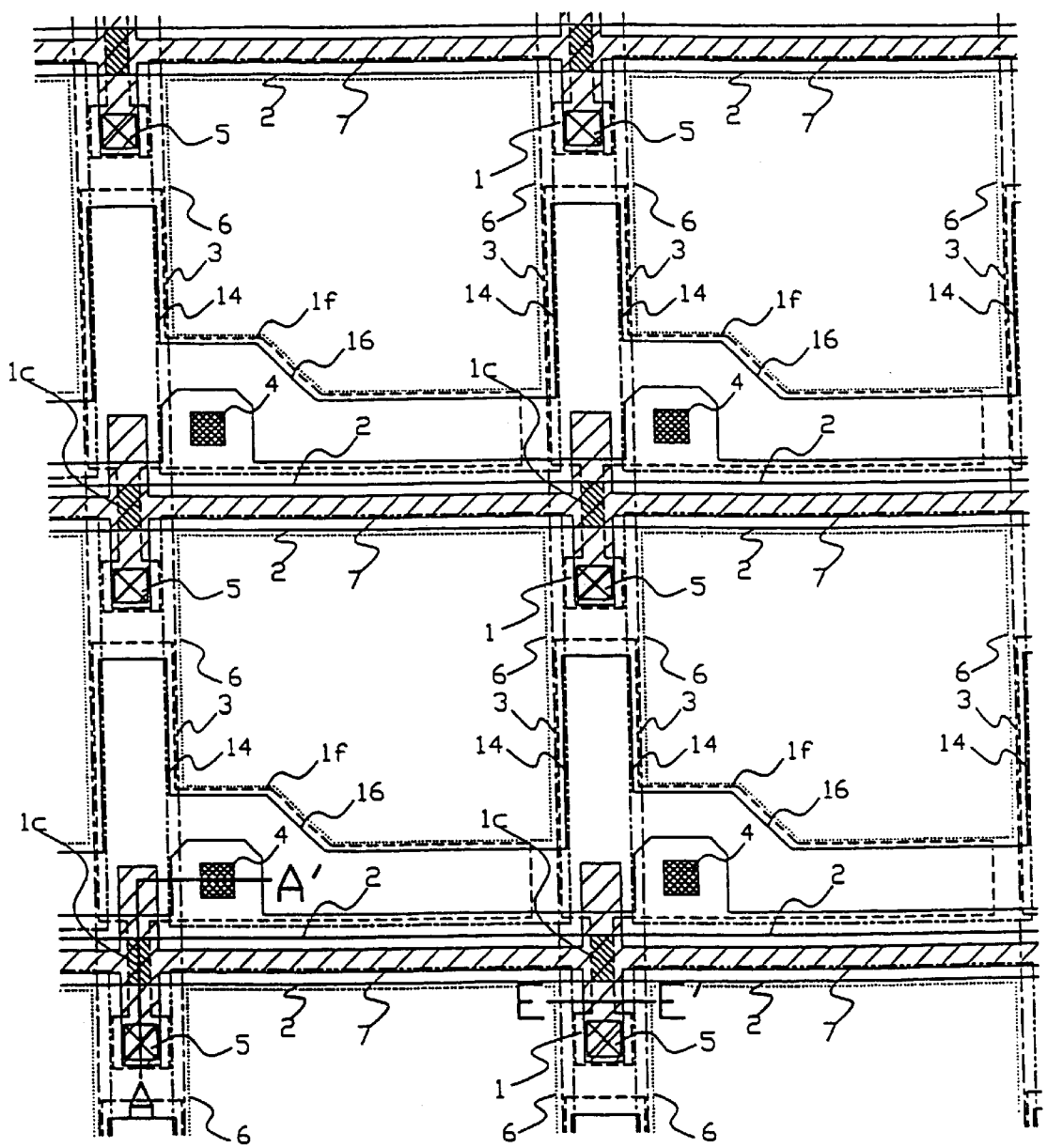
FIG. 13 is a plan view of pixels which represent the seventh embodiment of a substrate for a liquid crystal device to which this invention has been applied.
Figure 14:
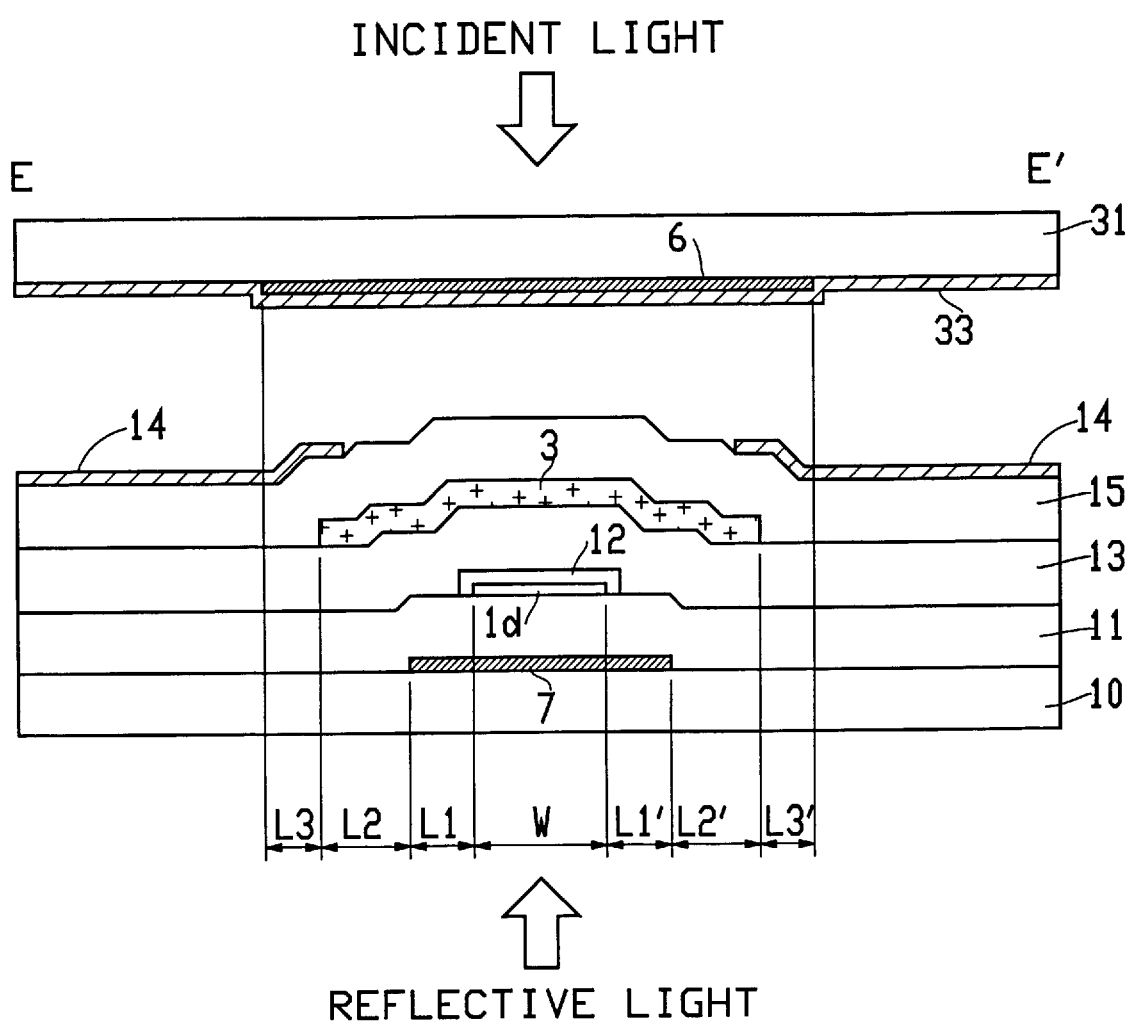
FIG. 14 is a sectional view of a pixel cut along the line E–E' of FIG. 13.

FIGS. 13 and 14 represent a representative embodiment of a pixel region of the substrate for a liquid crystal device to which this invention has been applied and are modifications of Embodiment 5. In Embodiment 7, a capacitance line 16 is placed below a pixel electrode 14 with its part running obliquely, thereby not occluding the pixel aperture unnecessarily. FIG. 14 is a plan view of pixels arrayed side by side, and FIG. 14 is a sectional view of a structure cut along line E–E' of FIG. 13. A cross-section along line A–A' of FIG. 13, or the sectional structure of a semiconductor layer 1 which acts as an active layer of the TFT has the same structure with that described above in embodiment 1 (FIG. 2). In embodiment 7, the semiconductor layer 1 formed above a first light shielding film 7 (areas shaded with parallel lines have a positive gradient in FIG. 13) with a first interlevel insulating film 11 inserted in between is so prepared as to have at least the channel region 1c (areas shaded with parallel lines having a negative gradient in FIG. 13) and LDD regions 1c and 1e (or offset regions) totally covered by the data line 3 (second light shielding film). In addition, a black matrix 6 (third light shielding film) applied on an opposite substrate 31 which is bonded to a substrate for the liquid crystal device with a liquid crystal inserted in between, is so arranged as to cover at least the first light shielding film 7. At this stage it is necessary to give an appropriate circuit pattern so that incident light coming from the side where the opposite substrate 31 resides may directly impinge on the first light shielding film 7.

To attain this, as shown in FIG. 14, the sizes of first light shielding film 7, second light shielding film 3 (data line) and third light shielding film 6(black matrix on the opposite substrate) must be determined with respect to the width W of the channel region 1c and LDD regions 1d and 1e (or offset regions). The widths of channel 1c, and the LDD regions 1d and 1e (or offset regions) may be the same or different. Desirably, the LDD regions id and 1e (or offset regions), and gate electrode (scan line) 2 must have the same width W, because such arrangement is helpful for the attainment of pattern alignment precision, and stabilization of the pixel TFT performance. If the two elements in question have to be altered in size, the LDD regions 1d and 1e (or offset regions) where electrons are more easily excited may have a smaller width than the channel region 1c, because this arrangement more securely ensures a display of high quality images. In all the embodiments to which this invention has been applied, the sizes of light shielding films are determined, assuming that the channel region 1c and LDD regions 1d and 1e have the same width. In FIG. 14, the shortest distances from the lateral edges of first light shielding film 7 covering the channel region 1c and LDD regions 1d and 1e (or offset regions) when seen from the back surface of substrate 10, to the channel region 1c and LDD regions 1d and 1e (or offset regions) are defined as L1 and L1'. Then, a wiring pattern is preferably laid out to satisfy the following definition formula:

$$0.2 \ \mu m \leq L1, L1' \leq 4 \ \mu m \qquad (1)$$

To achieve a high precision patterning of first light shielding film 7 while maintaining a high pixel aperture of the liquid crystal device, desirably a wiring pattern is more preferably laid out to satisfy the following definition formula:

$$0.8 \ \mu m \leq L1, L1' \leq 2 \ \mu m \qquad (2)$$

The values in the formula (2) are derived on the ground that, as the first interlevel insulating film 11 has a thickness of about 8,000 Å, light reflected from the back surface of substrate 10 must have an angle of 45° or more when measured at the lateral edge of first light shielding film 7 and from the direction of incident light, in order to reach the channel region 1c and LDD regions 1d and 1e (or offset regions). Principally, incident light comes as parallel rays to a direction normal to the display area of the liquid crystal device, and hence it is quite unlikely for incident light to be reflected with an angle of 45° or more when measured at the lateral edge of first light shielding film. Accordingly, as far as the formula (2) is satisfied, adverse effects due to reflective light can be practically ignored.

Next, the relationship between the first light shielding film 7 and the second light shielding film (data line 3) will be defined. To prevent the first light shielding film 7 against exposure to direct incident light, it is necessary for the second light shielding film (data line 3) which is located above the first light shielding film 7 to have a sufficient width. This is particularly true for this embodiment where the scan line 2 is absent, and LDD regions 1d and 1e are more susceptible to incident light. The shortest distances from the lateral edges of the second light shielding film to the lateral edges of first light shielding film are defined as L2 and L2'. Then, a wiring pattern is preferably laid out to satisfy the following definition formula:

$$0.2 \ \mu m \leq L2, L2' \qquad (3)$$

As the first and second interlevel insulating films 11 and 13 have a summed thickness of about 15,000 Å, desirably a wiring pattern is more preferably laid out to satisfy the following definition formula:

$$1.5 \ \mu m \leq L2, L2' \qquad (4)$$

These values are derived on the same ground as above involving the position of channel region 1c and LDD regions 1d and 1e (or offset regions) relative to the first light shielding film 7: unless incident light had an angle of 45° or more when measured at the lateral edge of the second light shielding film (data line 3), it could not reach the surface of first light shielding film 7. However, as shown in FIG. 13, as the first light shielding film 7 placed below the channel region 1c extends along the scan line 2, the formulas (3) and (4) are not satisfied at these overlapped areas. In spite of this, at least light shielding of channel region 1c and LDD regions 1d and 1e (or offset regions) poses no problem because they are safely covered by the scan line 2 and third light shielding film 6 (black matrix on the opposite substrate).

Next, the relationship between the second light shielding film (data line 3) and third light shielding film (black matrix 6 on the opposite substrate) must satisfy will be defined. Principally, as long as the second light shielding film (data line 3) has a sufficient light shielding property, use of the third light shielding film (black matrix 6 on the opposite substrate) will be unnecessary. Thus, it will be possible to omit the placement of black matrix 6 (third light shielding film) on the opposite substrate, as long as the scan line 2 is made of an light shielding film, and all sides of the pixel electrode 14 are totally covered by adjacent data lines 3 and scan lines 2. Elimination of the black matrix 6 (third light shielding film) from the surface of opposite substrate is further desirable in that it ensures a higher pixel aperture, because the black matrix, when wrongly aligned during bonding of the opposite substrate 10 to the substrate for the liquid crystal device, may cause the light transmission area of the pixel to be too narrow. When the second light shielding film is formed of a metal film such as aluminum, or a metal alloy film which easily develops tiny pin holes, it is necessary to add the third light shielding film (black matrix 6 on the opposite substrate) above the data line to prevent leakage of light through those holes, and such device will result in a redundant structure. When a black matrix 6

(third light shielding film) must be introduced, desirably, the distances L3 and L3' from the lateral edges of second light shielding films (data line 6) to the lateral edges of third light shielding film 6 satisfy the following formula (5).

$$L3, L3' \leq 1 \mu m \tag{5}$$

This is because, as long as the formula (5) is satisfied, the pixel aperture is not hardly affected by the existence of the black matrix.

The channel width W heavily depends on the writing performance of the pixel TFT, but if the on/off ratio of the TFT can be sixth order or more, the channel region with a shorter W gives a better result, because the channel region with a shorter width is less susceptible to stray light. Therefore, the channel region is so prepared as to satisfy:

$$0.2 \mu m \leq W \leq 4 \mu m \tag{6}$$

or, more preferably:

$$0.2 \mu m \leq W \leq 2 \mu m \tag{7}$$

Because, as long as above formulas are satisfied, the width of the data line 3 (second light shielding layer) can be narrowly formed, and thus a wider pixel aperture will be possible.

Embodiment 7 can also be produced through the same production processes as used for the production of embodiment 1

Embodiment 8 and Determination of the Size of Light Shielding Film Around a Scan Line 2

Figure 19:
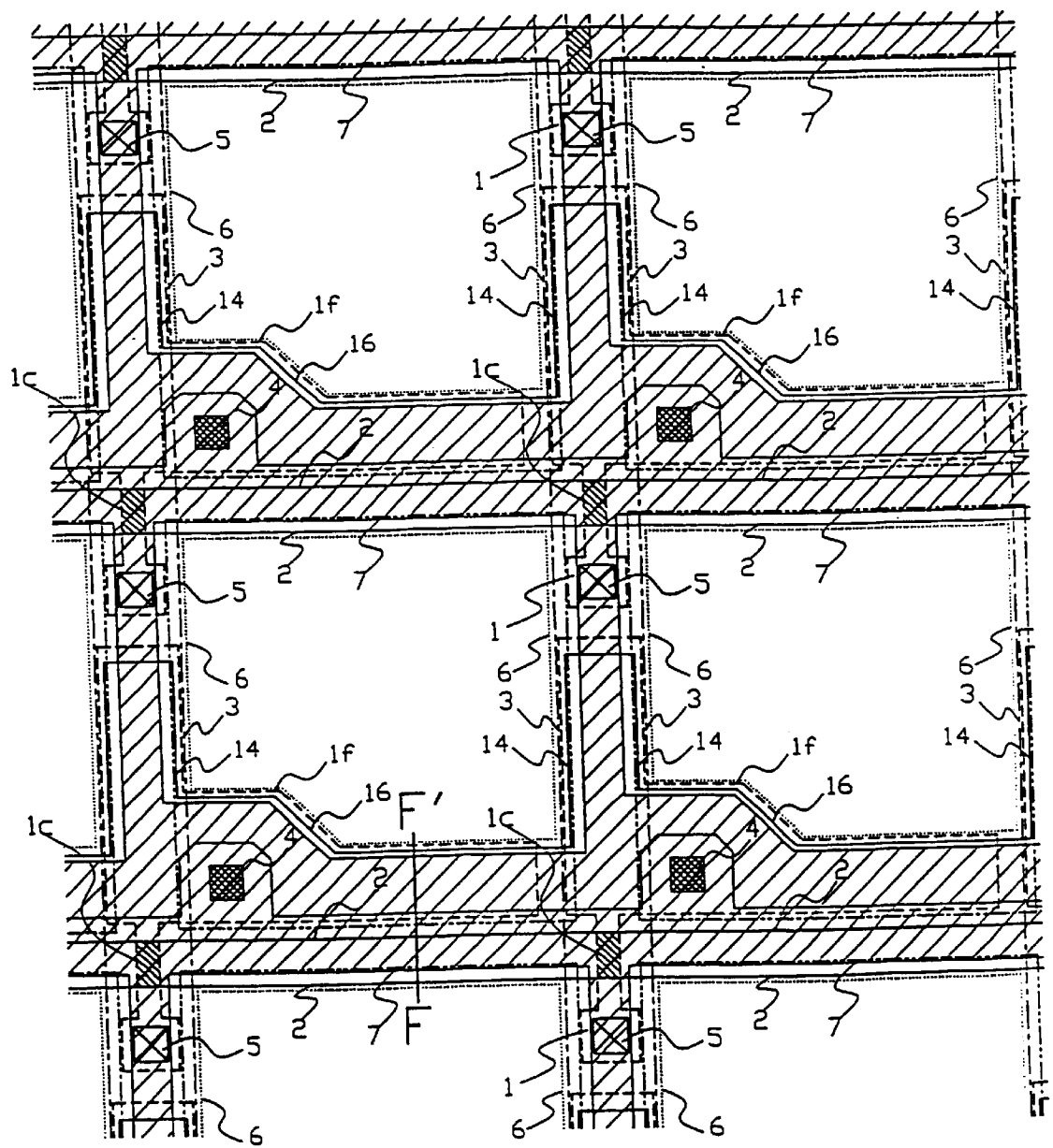
FIG. 19 is a plan view of pixels which represent the eighth embodiment of a substrate for a liquid crystal device to which this invention has been applied.
Figure 20:
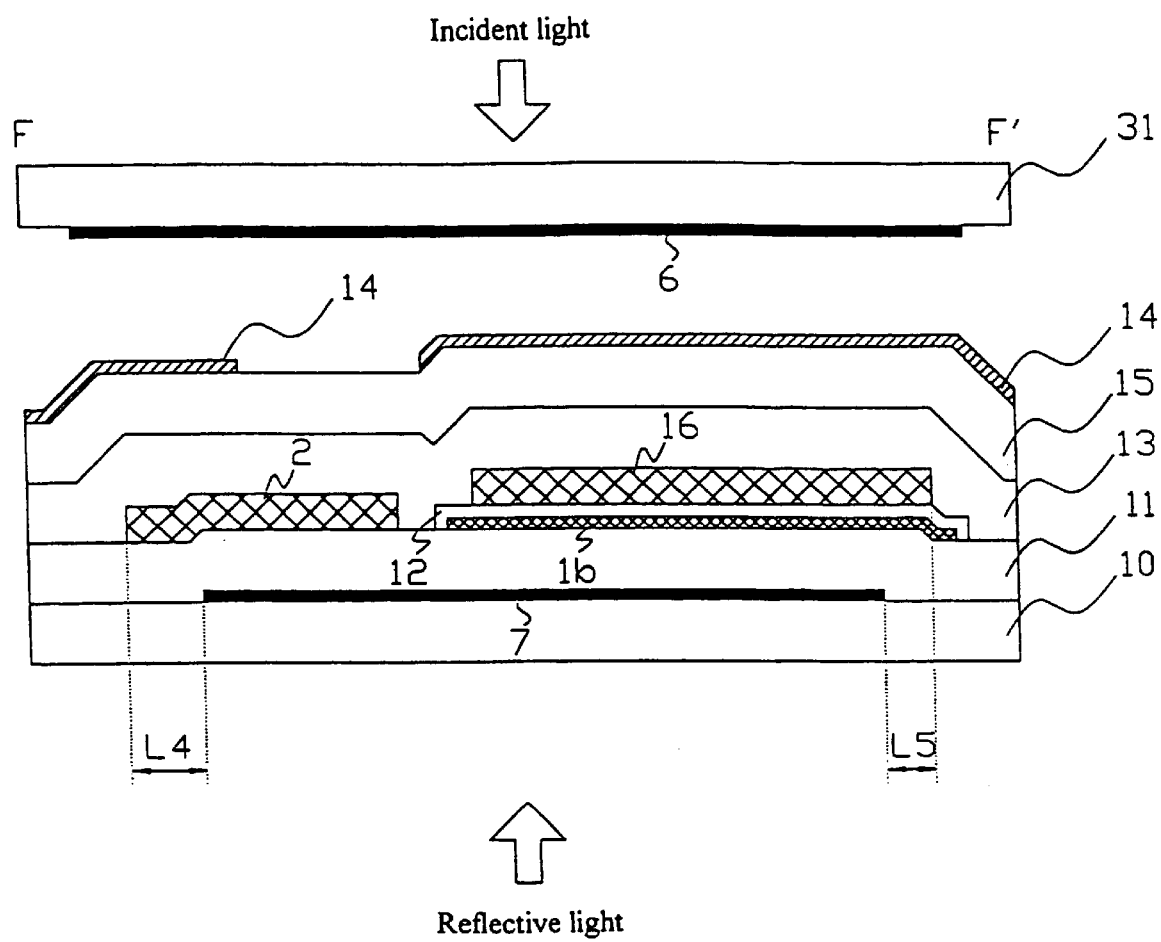
FIG. 20 is a sectional view of a pixel cut along the line F–F' of FIG. 19.

FIGS. 19 and 20 represents the eighth preferred embodiment of a substrate for liquid crystal device to which this invention has been applied. FIG. 19 is a plan view of pixels arrayed side by side, and FIG. 20 is a sectional view of a structure along line F–F' of FIG. 19. In embodiment 8, a first light shielding film 7 (areas shaded with parallel lines having a positive gradient in FIG. 19) as shown in embodiment 7 takes a matrix form not only below the scan line 2 but below a data line 3 and capacitance line 16. Through this arrangement it is possible for the first light shielding film 7 to have a lowered electric resistance, and for the drain region 1b of semiconductor layer 1 and first light shielding film 7 to act as a capacitor with a first interlevel insulating film 11 serving as a dielectric body, thereby to add an extra capacitance. Further, even if a black matrix 6 on an opposite substrate 31 has flaws, the first light shielding film 7 can share the same function as that of the black matrix achieves, such defects as dotty flaws will be successfully reduced.

Next, in FIG. 23, the relationship between the first light shielding film 7 and scan line 2 will be defined. The distance L4 from the lateral edge of first light shielding film below the scan line to the lateral edge of scan line 2 close to the pixel aperture should satisfy the following definition formula (8):

$$0.2 \mu m \leq L4 \tag{8}$$

This is because, unless the first light shielding film 7 is displaced from the lateral edge of scan line 2 towards the center of scan line 2, it will be directly exposed to incident light as long as the lateral edge of scan line 2 and the side along pixel aperture are positioned on the same side where the third light shielding film 6 resides.

Next, the relationship between the first light shielding film 7 below the capacitance line 16, and capacitance line 16 will be defined. The distance L5 from the lateral edge of first light shielding film 7 below the capacitance line 16 to the lateral edge of capacitance line 16 close to the pixel aperture should satisfy the following definition formula (9):

$$0.2 \mu m \leq L5 \tag{9}$$

This is because, unless the first light shielding film 7 is displaced from the lateral edge of capacitance line 16 towards the center of capacitance line 16, it will be directly exposed to incident light as long as the lateral edge of the capacitance line 16 and the side along the pixel aperture are positioned on the same side where the third light shielding film 6 resides.

Embodiment 8 can also be produced through the same production processes as used for the production of Embodiment 1. It is needless to say that the definition formulae (1) to (9) defined with respect to Embodiments 7 and 8 can be applied to any substrate for a liquid crystal device and any liquid crystal device to which this invention has been applied.

In Embodiments 1 to 8, description has been given assuming that the first light shielding film 7 is formed directly on the surface of a substrate 10 made of non-alkali glass or quartz, but it is possible to produce the first light shielding film 7 for better flattening its surface after a pattern of grooves corresponding with the layout of first light shielding film 7 has been inscribed by etching on the surface of a substrate 10, and the first light shielding film 7 been applied to fill those grooves. Further, the first light shielding film 7 has its surface so treated as to prevent reflection. The reflection prevention treatment may consist of oxidizing the surface of first light shielding film made of a metal film or a metal alloy film such as metal silicide by heating, to add an oxidized film, or of coating a polysilicon film by CVD on the surface of first light shielding film.

(Explanation of the liquid crystal device)

Figure 16:
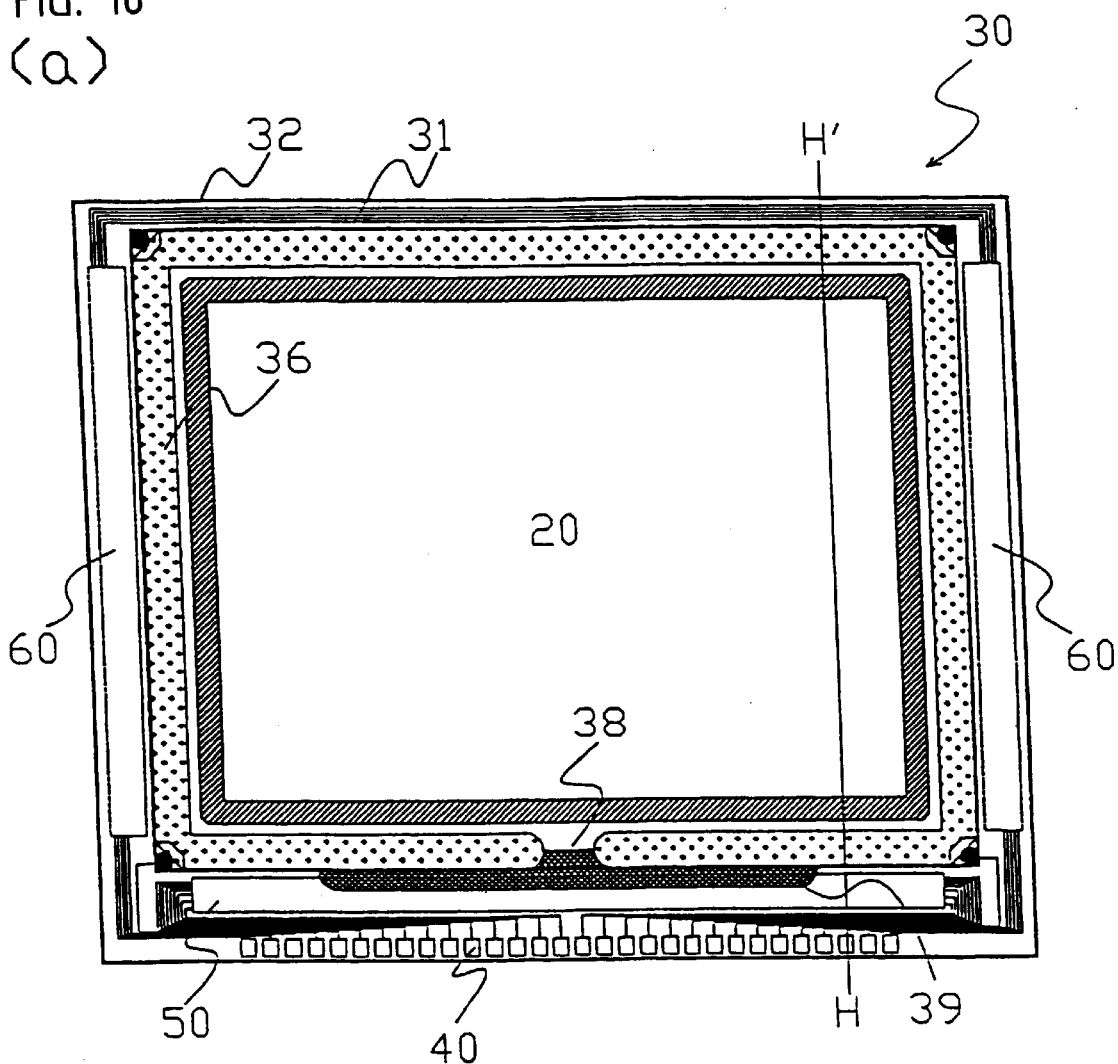
FIG. 16(*a*)–(*b*) are plan view and a sectional view respectively along line H–H' of a liquid crystal device incorporating a substrate for liquid crystal device prepared according to this invention.

FIG. 16(a) is a plan view illustration of the layout of the liquid crystal device 30 which incorporates the substrate 32 for the liquid crystal device. FIG. 16(b) is a sectional view of the same device along H–H' of FIG. 16(a). As shown in FIGS. 16(a) and 16(b), the opposite substrate 31 and the substrate for liquid crystal device 32 are bonded together with a sealing layer 36 comprising a gap material inserted between which fills a space formed between a display region 20 inside and data line driving circuit 50 and scan line driving circuit 60 outside, such that the two substrates give a specified cell gap. A liquid crystal 37 is enclosed in an inner space surrounded by the sealing layer 36. The sealing layer 36 has a break along its course, and through this break 38 (liquid crystal injection port) the liquid crystal 37 has been injected. In preparation of the liquid crystal device 30, after the opposite substrate 31 and the substrate 32 for the liquid crystal device have been bonded together, the inner region surrounded by the sealing layer 36 is evacuated and the liquid crystal 37 is injected. After the liquid crystal 37 has been enclosed, the liquid crystal injection port 38 is closed with a sealing material 39.

The sealing layer 36 may be made of an epoxy resin or various photosetting resins reactive to ultra-violet rays, and the gap material to be combined therewith may include plastics or glass fibers in the form of cylinders with a diameter of about 2–6 $\mu m$ or of balls. The liquid crystal may include well-known TN (Twisted Nematic) liquid crystals. Further, when the liquid crystal consists of a polymer-dispersed liquid crystal which is produced after liquid crystal particles are allowed to disperse in a polymer, it dispenses with the need for a alignment film and polarizer, and thus results in a liquid crystal device with highly efficient light utilization.

In the liquid crystal device 30 of this embodiment, the opposite substrate 31 is smaller in size than the substrate for liquid crystal device 32, and thus, when the two substrates are bonded together, the margins of substrate for liquid crystal device 32 protrude outside from those of opposite substrate 31. Accordingly, the data line driving circuit 50 and scan line driving circuit 60 are arranged in a space surrounding the margins of opposite substrate 31, and this arrangement is helpful for preventing degradation of an alighment film made of polyimide or the like, and of liquid crystal 37 which may otherwise result from exposure to direct current components from peripheral driving circuits. On the part of substrate for liquid crystal device 32 protruding outward from the margins of opposite substrate 31, a lot of input/output terminals 40 are formed which are electrically connected to external ICs, and those terminals are connected to a flexible printed substrate by wire bonding or by ACF (Anisotropic Conductive Film) bonding.

Figure 18:
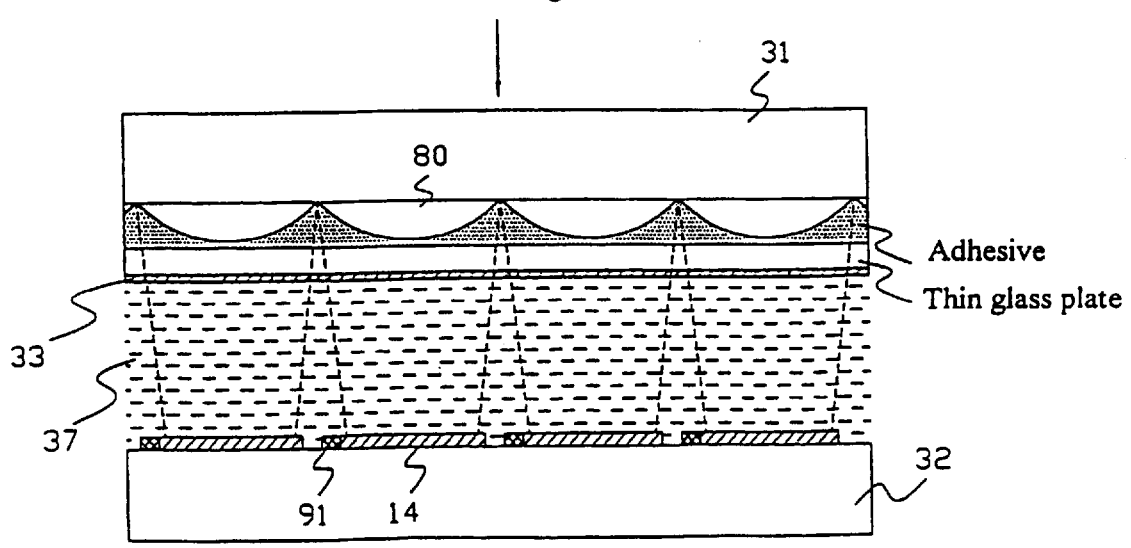
FIG. 18 is a sectional view of a liquid crystal device which incorporates small lenses on the opposite substrate to illustrate the constitution thereof.

Further, as shown in FIG. 18, in correspondence with pixel electrodes 14 formed on the substrate for liquid crystal device 32, small lenses 80 are prepared in the form of a matrix on the opposite substrate 31, and as each small lens 80 can focus incident light on the pixel aperture region of a corresponding pixel electrode 14, it is possible to greatly increase the contrast and brightness of images. In addition, as incident light is converged by the small lens 80, impingement of light upon the channel region 1e and LDD regions 1d and 1e (or offset regions) of pixel TFT 91 from an oblique angle can be effectively prevented. Even if light converged by the small lens is reflected by the back surface of the substrate for liquid crystal device 32, the substrate in question has the first light shielding film 7 so implemented as to prevent the reflective light from impinging on the channel region 1c and LDD regions 1d and 1e (or offset regions) of the pixel TFT 91. Accordingly, a strong beam resulting from convergence by the small lens does not affect the performance of the TFT, which ensures the production of a liquid crystal device with a display of high quality images. When small lenses 60 are implemented, incident light on a pixel aperture is converged by the lens as indicated by dotted lines in FIG. 18, and thus it is possible to remove the black matrix 6 on the opposite substrate 31 without causing any extra troubles. Incidentally, although, in FIG. 18, small lenses 80 are placed on the opposite substrate 31 on the side facing the opposite electrode 33, they may be placed on the opposite substrate 31 on the reverse side, and appropriately adjusted to focus incident light on the substrate for liquid crystal device 32 carrying respective pixel TFTs. In the latter arrangement as compared with the former, it is easier to adjust the cell gap. As shown in FIG. 18, small lenses made of a resin or the like are arrayed closely to each other with no interstices between, and bonded with an adhesive onto a thin glass plate. Then, when the opposite electrode is formed on the thin glass plate, adjustment of the cell gap becomes easy and a sufficiently efficient light utilization is achieved.

(Driving of the liquid crystal device)

Figure 15:
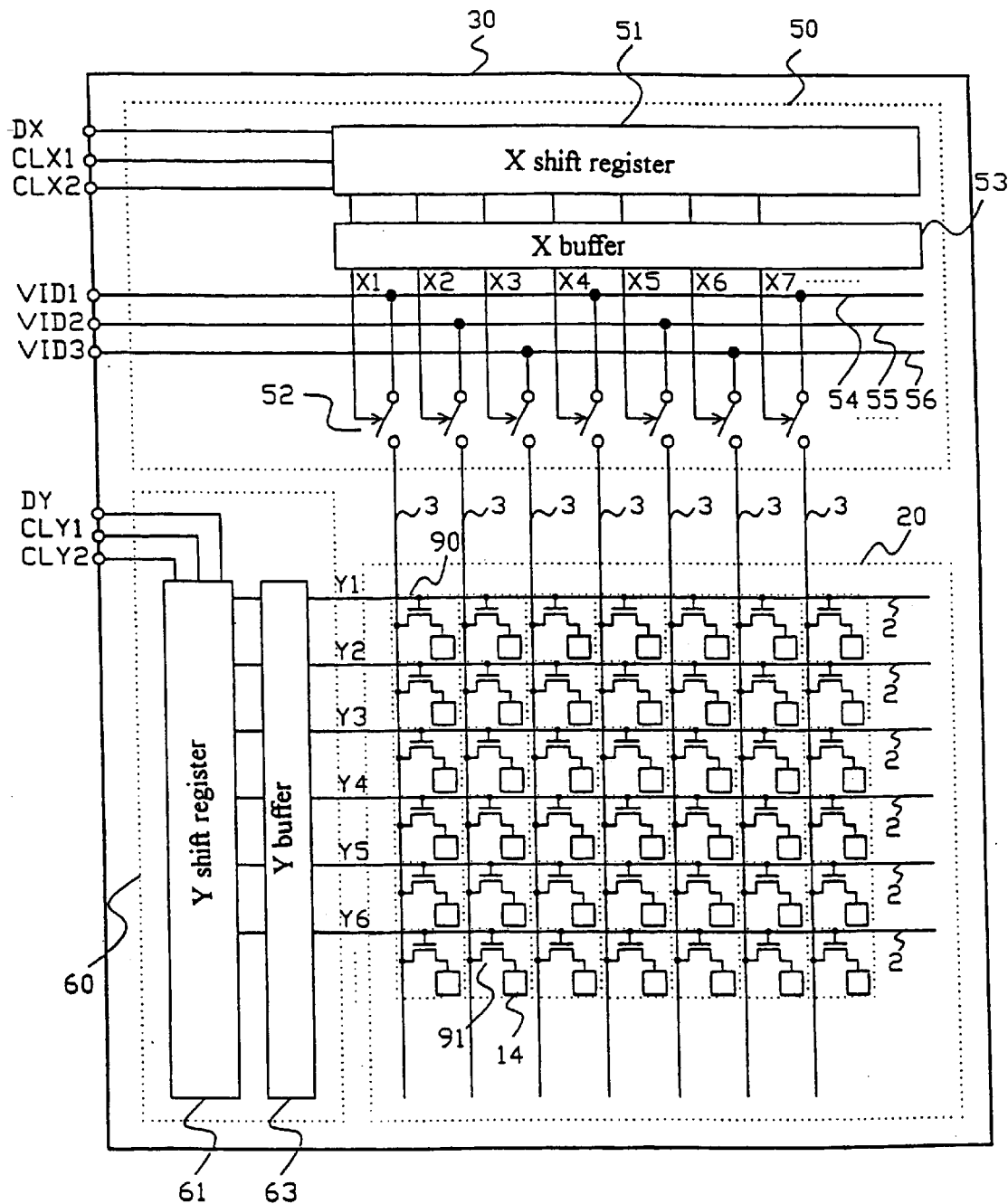
FIG. 15 is a block diagram illustrating the constitution of a substrate for a liquid crystal device to which this invention is preferably applied.

FIG. 15 shows the system composition of the liquid crystal device 30 incorporating the substrate for the liquid crystal device of embodiments 1 to 8. In this figure, 90 represents a pixel placed at each intersection formed between the scan line 2 and data line 3, and each pixel 90 consists of a pixel electrode 14 made of an ITO film and a pixel TFT 91 which applies a voltage in response to an image signal supplied to the data line 3. Pixels TFT 91 arranged in the same column have the gate electrodes connected to the same scan line 2, and the drain regions 1b to corresponding pixel electrodes 14, On the other hand, pixels TFT 91 arranged in the same rows have the source regions 1a connected to the same data line 3. In this embodiment, transistors constituting the data line driving circuit 50 and scan line driving circuit 60 are composed of polysilicon TFTs each of which, like the pixel TFT 91, uses a polysilicon film as the semiconductor layer. The transistors constituting peripheral driving circuits (such as data line driving circuit 50, scan line driving circuit 60, etc.) are composed of CMOS type TFTs, and can be placed on the same substrate by the same process as used for the production of pixel TFT 91.

In this embodiment, at least on one side (upper side in the figure) of the display region 20 (region where pixels are arranged in the form of a matrix) is placed a shift register 51 (to be referred to as X-shift register hereafter) which selects the data lines 3 one after another in order, and an X-buffer 53 which amplifies the output signal from X-shift register 51. Further, at least on one other side of the display region 20 is placed another shift register 61 (to be referred to as Y-shift register hereafter) which drives the scan lines 2 one after another in order. Further, a Y-buffer 63 is added which amplifies the output signal from Y-shift register 61. Furthermore, on one end of each data line 3 is placed a sampling switch 52 (TFT) which is connected to an image signal line 54, 55 or 56 which transmits, for embodiment, image signals VID1–VID3 fed from outside, and those sampling switches are so arranged as to be switched on/off in order in response to sampling signals provided by X-shift register 51. X-shift register 51, based on clock signals CLX1, counter clock signals CLX2 and start signals DX fed from outside, produces sampling signals X1, X2, X3, . . . , Xn which allow an orderly activation of all data lines 3 in one horizontal scan period, and provides them to control terminals of sampling switches 52 On the other hand, Y-shift register 61 is put into activation in synch with clock signals CLY1, counter clock signals CLY2 and start signals DY fed from outside, and drives scan lines 2 of Y1, Y2, . . . , Yn in order.

(Explanation of the projection type display system)

Figure 17:
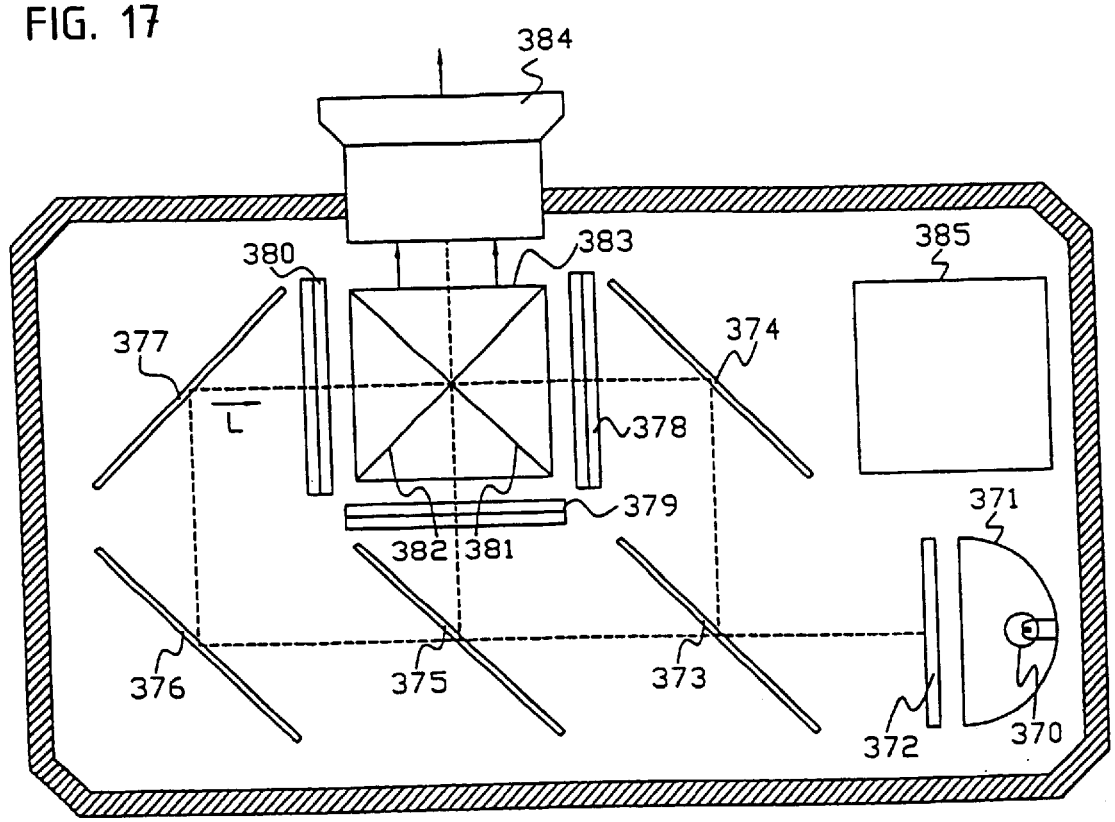
FIG. 17 is a schematic diagram outlining the constitution of a liquid crystal projector presented as an embodiment of a projection type display system which incorporates as a light valve a liquid crystal device containing a substrate for a liquid crystal device prepared according to this invention.

FIG. 17 shows the constitution of a liquid crystal projector cited as an embodiment of projection type display device which incorporates the liquid crystal device of foregoing embodiments as a light valve.

In FIG. 17, 370 represents a light source such as a halogen lamp, 371 a parabolic mirror, 372 a filter to cut off heat rays, 373, 375 and 376 dichroic mirrors reflecting blue light, green light and red light, respectively, 374 and 377 reflective mirrors, 378, 379 and 380 light valves consisting of liquid crystal devices of the foregoing embodiments, and 383 a dichroic prism.

In the liquid crystal projector of this embodiment, white light emitted from the light source 370 is converged by the mirror 371, passes through the heat-ray cutting-off filter 372 to be removed of its heat ray component in the infra-red region, and impinges on the dichroic mirror system as visible rays. Then, firstly, blue rays (having a wavelength of about 500 nm or shorter) are reflected by the dichroic mirror to reflect blue rays 373, and other rays (yellow rays) pass through it. The blue light component thus reflected changes its direction after being reflected by the reflective mirror 374, and is incident on the blue-light modulating light valve 378.

On the other hand, light passing through the blue light reflecting dichroic mirror 373 is incident on the green-light reflecting dichroic mirror 375 which reflects only a green light component (having a wavelength of about 500–600 nm), and the remaining light component or red light passes through it. The green light component reflected by the dichroic mirror 375 is incident on the green-light modulating light valve 379. Red light passing through the dichroic mirror 375 changes its direction after being deflected by the reflective mirrors 376 and 377 and is incident on the red-light modulating light valve 380.

The light valves 378, 379 and 380 are driven by three primary color signals corresponding to blue, green and red components respectively fed from an image signal processing circuit not illustrated here. The light components incident on the respective light valves are modulated there and combined by the dichroic prism 383. The dichroic mirror 383 is so constructed as to have the red-light reflective surface 381 and blue-light reflective surface 382 intersect each other at right angles. Then, a color image produced after the light components have been combined by the dichroic mirror 383 is projected by the projection lens 384 onto a screen as an enlarged image for display.

With the liquid crystal device incorporating this invention, as a leakage current generated from a pixel TFT 91 exposed to stray light is effectively suppressed, such a liquid crystal projector as described above incorporating the liquid crystal devices as light valves can give images with a high contrast for display. Further, as the device in question has a high light shielding property, degradation of image quality due to stray light will never result even when the light source 370 gives bright light, or polarizing beam-splitters are inserted between the light source 370 and each of light valves 378, 379 and 380, to polarize the respective light components and thereby to improve light utilization efficiency. Thus, a liquid crystal projector giving a bright display will result. Furthermore, light reflected from the back surface of the substrate for liquid crystal device is practically negligible, and thus bonding of a non-glare polarizer or film onto reflective surfaces of the system becomes unnecessary, which contributes to a lowering of production cost.

As shown in FIG. 17, for the system where triple light valves corresponding to the red, green and blue light components and a dichroic prism are used in combination, this invention is particularly advantageous. Take, for embodiment, light reflected by the dichroic mirror 274. It passes through the light valve 378 and is combined with other light components by the dichroic prism 383. In this case, light incident on the light valve 378 is modulated by 90° and is incident on the projection lens. However, a very tiny portion of incident light on the light valve 378 may leak outside and enter the light valve 380 on the opposite side. Accordingly, to the light valve 380, comes not only light reflected from the dichroic mirror 377 (incident light advancing in the direction indicated by L in the figure) but possibly a portion of light passing through the light valve 378 and then passing through the dichroic prism 382. Further, when light reflected by the dichroic mirror 377 passes through the light valve 380 and is incident on the dichroic prism 382, a tiny portion thereof may be reflected (normal reflection) from the dichroic prism 383, and reenter the light valve 380. As discussed above, the light valve is often exposed not only to light from the incoming path but to light from paths running in the opposite direction. To cope with this situation, with this invention, as seen from the above description of the embodiments, light shielding films are implemented around the pixel TFT 91 to shield it from light coming not only along the incoming path but along paths in the opposite direction. In addition, the black matrix 6 having a larger size than the first light shielding film 7 is placed on the opposite substrate 31, to prevent light reflected from the first light shielding film 7 from impinging on the channel region 1$c$ and LDD regions 1$d$ and 1$e$ (or offset regions) of pixel TFT 91, and thus the channel region 1$c$ and LDD regions 1$d$ and 1$e$ (or offset regions) in question can be safely protected against exposure to light coming not only from the incoming path but from passes in the opposite direction (or from the back surface). Therefore, this system ensures a great reduction of leakage current which would otherwise result from the TFT being exposed to stray light.

Industrial Applicability

As detailed above, according to a substrate for liquid crystal device as described in claim 1, with regard to light incident to a channel region, and junctions between the channel region and source/drain regions, a first light shielding film shields light from above and a second light shielding film shields light from below. Thus, it is possible to reduce a leakage current which would otherwise result from the TFT being exposed to light. Therefore, according to this invention, it is possible, for embodiment, to produce a substrate for a liquid crystal device with high performance active matrix pixels. Further, a substrate for the liquid crystal device to which this invention has been applied is most appropriate to be applied for the liquid crystal device, projector or the like.

What is claimed is:

1. A liquid crystal device, comprising:
   a first substrate;
   a second substrate;
   a plurality of data lines formed above the first substrate;
   a plurality of scan lines crossing the plurality of data lines;
   a plurality of thin film transistors connected to the plurality of data lines and the plurality of scan lines;
   a plurality of pixel electrodes connected to the plurality of thin film transistors;
   a first light shielding film extending along the scan lines, formed at least below a channel region of the thin film transistors, and below junctions between the channel region and a source region and between the channel region and a drain region of the thin film transistors; and
   a second light shielding film formed above the channel region and the junctions between the channel region and the source region and between the channel region and the drain region,
   a width of the second light shielding film being more than a width of the first light shielding film.

2. The liquid crystal device as described in claim 1, the thin film transistor having a semiconductor layer which intersects twice the scan line.

3. The liquid crystal device as described in claim 2, the second light shielding film is formed below at least one region of the semiconductor layer intersecting twice with the scan line.

4. The liquid crystal device as described in claim 3, the second light shielding film is the data line.

5. The liquid crystal device as described in claim 2, the first light shielding film being formed below at least one region of the semiconductor layer intersecting twice with the scan line.

6. The liquid crystal device as described in claim 1, further comprising a contact hole connecting a semiconductor layer of the thin film transistor and the data line.

7. The liquid crystal device as described in claim 6, the semiconductor layer having a region that extends from the contact hole along the data line, intersecting the scan line.

8. A liquid crystal device, comprising:
- a first substrate;
- a second substrate;
- a plurality of data lines formed above the first substrate;
- a plurality of scan lines crossing the plurality of data lines;
- a plurality of thin film transistors connected to the plurality of data lines and the plurality of scan lines;
- a plurality of pixel electrodes connected to the plurality of thin film transistors;
- a first light shielding film extending along the data lines, formed at least below a channel region of the thin film transistors, and below junctions between the channel region and a source region and between the channel region and a drain region of the thin film transistors; and
- a second light shielding film formed above the channel region and the junctions between the channel region and the source region and between the channel region and the drain region,
- a width of the second light shielding film being more than a width of the first light shielding film.

9. The liquid crystal device as described in claim 8, the second light shielding film is the data line.

* * * * *